(12) United States Patent
Woelfing et al.

(10) Patent No.: US 9,611,988 B2
(45) Date of Patent: Apr. 4, 2017

(54) LIGHTING EQUIPMENT FOR GENERATING LIGHT OF HIGH LUMINANCE

(71) Applicant: SCHOTT AG, Mainz (DE)

(72) Inventors: Bernd Woelfing, Mainz (DE); Volker Hagemann, Klein-Winternheim (DE); Juergen Meinl, Hohenstein-Holzhausen (DE)

(73) Assignee: SCHOTT AG (DE)

( * ) Notice: Subject to any disclaimer, the term of this patent is extended or adjusted under 35 U.S.C. 154(b) by 58 days.

(21) Appl. No.: 14/492,403

(22) Filed: Sep. 22, 2014

(65) Prior Publication Data
US 2015/0062953 A1   Mar. 5, 2015

Related U.S. Application Data

(63) Continuation of application No. PCT/EP2013/055232, filed on Mar. 14, 2013.
(Continued)

(30) Foreign Application Priority Data

Mar. 22, 2012 (DE) .......................... 10 2012 005 660
Jun. 26, 2012  (EP) ..................................... 12173604

(51) Int. Cl.
*F21V 7/04*     (2006.01)
*F21K 99/00*    (2016.01)
(Continued)

(52) U.S. Cl.
CPC ................ *F21K 9/56* (2013.01); *B60Q 1/00* (2013.01); *F21K 9/61* (2016.08); *F21K 9/64* (2016.08);
(Continued)

(58) Field of Classification Search
CPC ..... F21K 9/56; F21K 9/52; F21K 9/64; G02B 6/006; G02B 6/0008; G02B 6/0006;
(Continued)

(56) References Cited

U.S. PATENT DOCUMENTS 7,356,054 B2    4/2008  Hama et al.
8,702,286 B2 *  4/2014  Nakazato ............. F21S 48/1145
                                                              362/510
(Continued)

FOREIGN PATENT DOCUMENTS

DE    102008031256 A1    1/2010
DE    102009012138 A1    9/2010
(Continued)

OTHER PUBLICATIONS

English translation of International Search Report of the International Search Authority dated Jun. 11, 2013 for corresponding International Application No. PCT/EP2013/055232, 3 pages.
(Continued)

*Primary Examiner* — Bryon T Gyllstrom
(74) *Attorney, Agent, or Firm* — Ohlandt, Greeley, Ruggiero & Perle, L.L.P.

(57) ABSTRACT

Lighting equipment for generating white light from blue or violet excitation light and converted emitted yellow light is provided. The excitation light is directed at an oblique angle towards a converter that is attached to a carrier device, without the emitted illumination light impinging on the carrier device.

20 Claims, 24 Drawing Sheets

Related U.S. Application Data

(60) Provisional application No. 61/614,101, filed on Mar. 22, 2012.

(51) Int. Cl.
*F21V 8/00* (2006.01)
*F21S 8/10* (2006.01)
*B60Q 1/00* (2006.01)
*F21K 9/61* (2016.01)
*F21K 9/64* (2016.01)

(52) U.S. Cl.
CPC ......... *F21S 48/115* (2013.01); *F21S 48/1131* (2013.01); *F21S 48/1136* (2013.01); *G02B 6/0006* (2013.01); *G02B 6/0008* (2013.01)

(58) Field of Classification Search
CPC ..... B60Q 1/00; F21S 48/1131; F21S 48/1136; F21S 48/115
USPC .................................................. 362/551, 84
See application file for complete search history.

(56) References Cited

U.S. PATENT DOCUMENTS

| | | | | |
|---|---|---|---|---|
| 8,733,996 | B2* | 5/2014 | Kishimoto | B60Q 1/0011 362/553 |
| 9,103,517 | B2* | 8/2015 | Nakazato | F21S 48/1145 |
| 2009/0129052 | A1* | 5/2009 | Hirosaki | C04B 35/584 362/84 |
| 2010/0067233 | A1 | 3/2010 | Bechtel et al. | |
| 2011/0157865 | A1* | 6/2011 | Takahashi | F21K 9/56 362/84 |
| 2011/0222149 | A1 | 9/2011 | Saito et al. | |
| 2011/0255264 | A1 | 10/2011 | Tsutsumi et al. | |
| 2011/0280031 | A1* | 11/2011 | Luger | F21S 48/1154 362/520 |
| 2012/0018754 | A1* | 1/2012 | Lowes | F21K 9/135 257/98 |
| 2012/0104934 | A1* | 5/2012 | Fukai | F21S 48/1145 313/498 |
| 2012/0106178 | A1* | 5/2012 | Takahashi | B60Q 1/0035 362/459 |
| 2012/0106188 | A1* | 5/2012 | Takahashi | F21S 48/1241 362/516 |
| 2012/0224384 | A1* | 9/2012 | Takahira | F21V 9/16 362/509 |

FOREIGN PATENT DOCUMENTS

| | | |
|---|---|---|
| DE | 102010028949 A1 | 11/2011 |
| EP | 2551154 A2 | 1/2013 |
| JP | 2004241142 A | 8/2004 |
| JP | 2010232044 A | 10/2010 |
| WO | 2012025141 A1 | 3/2012 |

OTHER PUBLICATIONS

English translation of Written Opinion of the International Search Authority dated Jun. 11, 2013 for corresponding International Application No. PCT/EP2013/055232, 10 pages.

German Office Action dated Dec. 5, 2012 for corresponding German Application No. 10 2012 005 660.5 with English translation, 10 pages.

English translation of International Preliminary Report on Patentability dated Sep. 23, 2014 for corresponding International Application No. PCT/EP2013/055232, 11 pages.

* cited by examiner

LIGHTING EQUIPMENT FOR GENERATING LIGHT OF HIGH LUMINANCE

CROSS REFERENCE TO RELATED APPLICATIONS

This application is a continuation of International Application No. PCT/EP2013/055232 filed Mar. 14, 2013, which claims the benefit of U.S. Provisional Application Ser. No. 61/614,101 filed Mar. 22, 2012 and claims benefit under 35 U.S.C. §119(a) of German Patent Application No. 10 2012 005 660.5 filed Mar. 22, 2012 and European Application No. 12173604.5 filed Jun. 26, 2012, the entire contents of all of which are incorporated herein by reference.

BACKGROUND

1. Field of the Disclosure

The present invention relates to lighting equipment for generating high luminance light, in particular white light, which comprises at least one radiation source, a conversion medium, and a carrier device for positioning and fixing the radiation source relative to the conversion medium. The conversion medium is arranged in the optical path of the radiation source and converts at least part of the incident light to a different spectral region, with remission thereof.

The radiation source will also be referred to as a primary light source below; the conversion medium as a secondary light source.

Further, lighting equipment according to the invention comprises a fiber feed by means of which light is guided from the primary light source via at least one light conductor which represents the fiber feed and via at least one optical element to at least one secondary light source which reflects and/or remits back at least part of the supplied light towards the optical element, the optical element causing slight shadowing of the reflected and/or remitted light. In the context of the invention, light refers to electromagnetic radiation which need not be in the visible spectral range, rather in particular IR and UV wavelengths are also within the scope of the invention.

2. Description of Related Art

White light sources can be found in numerous applications, for example in the fields of medical diagnosis or non-contact measuring methods. Other applications may comprise the lighting of buildings. Another important application field is the automotive sector, where such lighting equipment may be used in headlights or as a headlight, for example.

Up-to-date headlights in the automotive sector often comprise LED light sources, such as described in document DE 10 2008 031 256 A1, which provide for white lighting. A drawback therein is the complexity of implementing sufficient cooling and adequate removal of heat from the LED device.

Another development is aiming to connect a light source to lighting equipment via a light conductor. This allows to spatially uncouple light source and lighting equipment from each other. For generating white light, frequently a conversion medium is used which is arranged in the region of the lighting equipment. The conversion medium, also referred to as a converter, thereby enables conversion of the incident radiation in terms of wavelengths, so that white light can be generated in this manner.

U.S. Pat. No. 7,356,054 B2 describes such lighting equipment. Here, the conversion medium is directly connected to the end of the light conductor to achieve high luminance. Excitation of the conversion medium is therefore accomplished in transmission, i.e. the radiation is incident on one side of the conversion medium and is emitted via another side. Comparatively high power dissipation in the conversion medium, which may lead to heating and high thermal stress in the conversion medium may prove to be disadvantageous because heat removal is difficult with such an arrangement of radiation device and conversion medium. Both the geometry of the cooling and the limited possibility to adjust the numeral aperture NA of the excitation light through scattering are unfavorable circumstances in lighting equipment working in transmission. Also in this case light would be lost by backscattering.

According to the teachings of WO 2012 025141 this problem is solved by having a fiber diameter which is small as compared to the spacing between fiber and converter. This means that only a small special angle portion is shaded by the fiber end face. The holder of the fiber is located outside the reflector. The converter is supported within the emission region of the converted useful light. The converter additionally needs a cooling element. A holder of the converter is not shown but is necessary for implementation. This holder must have a filigree structure, so as not to shade even more light, and on the other hand must be as stable as possible to ensure high positional accuracy of the converter and reflector. Moreover, the converter needs to be positioned exactly relative to the light exit of the fiber end face. In the solution illustrated this is only possible by a complex mechanical structure.

SUMMARY

What would be desirable, therefore, is lighting equipment for generating light of high luminance, especially white light, with sufficiently high efficiency and with greatly simplified heat removal.

In addition, the lighting equipment should permit simple and safe installation of the necessary elements, in particular a radiation source and a conversion medium.

Also, shadowing caused by the light feed should be as low as possible.

Moreover, the light spot should be as small as possible in order to achieve high luminance.

The lighting equipment should be suitable for different applications, in particular it should be useful in reflector devices or projection devices, and especially in headlights.

Generally, it is desirable to supply the light of the primary light source to the secondary light source in the most defined manner possible, in particular as point-like as possible. Depending on the emission profiles of the primary light source, such as with laser diodes as a primary light source, it may be necessary for this purpose to bundle the light emitted from the primary light source using light conducting fibers and to guide it to the secondary light source in this manner.

When feeding the excitation light via a fiber, the excitation light has to be supplied through the smallest possible fiber diameter with the smallest possible numerical aperture NA. In case the excitation light is provided with a rather poor beam parameter product, which is the product of the NA and the fiber end diameter, the luminance of the lighting equipment is reduced, and the shadowing by the optical device itself increases.

Against this background, another object of the present invention is to provide lighting equipment including a reflection and/or remission light source as a secondary light source and a fiber feed which are adapted even for excitation light of a moderate beam parameter product.

Surprisingly simple, this object is achieved by lighting equipment for generating light, in particular white light, comprising at least a radiation source, a conversion medium, and a carrier device.

Accordingly, the subject matter of the invention comprises lighting equipment for generating light, in particular white light, comprising an excitation light source for emitting blue or ultraviolet excitation light; a conversion medium for converting the excitation light into light of longer wavelengths, preferably into light of longer wavelengths such that the light remitted from the conversion medium appears white; and a carrier device for directing the excitation light at an oblique angle onto a central surface area of the conversion medium, such that the major part of the excitation light enters the conversion medium and, after conversion, is emitted in the direction of illumination essentially without impinging on the carrier device.

The inventors have found that lighting equipment in which conversion of a fraction of the electromagnetic radiation from a radiation source is accomplished through remission may be particularly advantageous in terms of heat removal from the conversion medium and the geometrical configuration of the lighting equipment.

Accordingly, the lighting equipment comprises at least one radiation source for emitting electromagnetic radiation. The electromagnetic radiation emitted from the radiation source will also be referred to as excitation light below, and the radiation source as excitation light source or primary light source.

The excitation light source may comprise a light source for generating monochromatic light, the light source preferably emitting in the blue and/or ultraviolet spectral range. The light of the monochromatic light source may be generated by a laser.

Accordingly, the subject matter of the invention includes an excitation light source, in particular a monochromatic light source, wherein the monochromatic light may be generated by a laser. The blue and/or ultraviolet spectral range of the radiation emitted from the excitation light source refers to the range of wavelengths predominantly below 500 nm, preferably below 480 nm, and most preferably below 470 nm.

In a preferred embodiment, the light source comprises at least one semiconductor laser or at least one laser diode or a blue laser diode bar or an array of blue laser diodes which may achieve very high power densities.

The laser source may even be provided directly on the carrier device. Direct irradiation of the conversion medium from the laser diode is disadvantageous because the numeral aperture NA of the emitted radiation is usually very high. Therefore, if the spacing would be chosen very small, strong shadowing would result due to the necessary casing.

Therefore, it is particularly advantageous in this case if the radiation of the laser diode is focused onto the conversion medium via an optical system. The configuration has to be chosen so that there is as little framing as possible disposed around the optical system. If the anisotropy of the laser diode is not corrected through the optical system, it is advantageous to project the resulting elliptical light spot onto the conversion medium in a manner so that a tilt causes a widening of the short axis.

The excitation light source may further comprise at least one light conductor or optical light conductor having a radiation emitting end which can be connected to the carrier device. At the opposite end of the optical light conductor, excitation light from an excitation light source may be injected. Particularly preferably, electromagnetic radiation in the blue and/or ultraviolet spectral range may be injected into the optical light conductor.

Lighting equipment according to the invention may therefore comprise at least one light conductor, which will also be referred to as an optical light conductor or optical fiber below. The excitation light emitted from the primary light source is injected into the light conductor. A butt coupling is preferred, in which there are no further optical elements arranged between the primary light source and the light conductor. Therefore, the numeral aperture NA of the light conductor is preferably selected depending on the emission profile of the primary light source and the position thereof relative to the entrance face of the light conductor.

The present invention is based on the concept to preferably preserve the product of numeral aperture NA and beam diameter of the excitation light from the primary light source as given at the respective fiber end face until impingement thereof on the secondary light source, usually the converter and/or reflector. This should not cause a disproportionate rise of the implementation cost of the optical device.

In this manner, it is possible to spatially separate the excitation light source from the lighting equipment. This may be advantageous when, for example due to space constraints, the excitation light source cannot be placed within the lighting equipment or in a proximate range thereof. Furthermore, the excitation light source can be thermally uncoupled from the lighting equipment in this manner, and can be better cooled therefore. Moreover, it is possible to supply excitation light to a plurality of lighting equipment devices according to the invention using only one excitation light source. For this purpose, for example, the excitation light may be injected into at least two or more optical light conductors in parallel. For this purpose, the optical light conductor may comprise a beam splitter having one input end and at least two or more exit ends.

In order to achieve very high luminance, and in particular to achieve a particularly high power, it is also possible to inject excitation light from a plurality of excitation light sources into one optical light conductor. But it is also possible to convey excitation light from a plurality of excitation light sources via a plurality of optical light conductors to the lighting equipment to emit it onto the conversion medium.

In a particularly preferred embodiment, the optical light conductor may comprise a fiber optic light conductor. Typically, such light conductors comprise a core region and a cladding region of different refractive indices and are capable to guide electromagnetic radiation, for example through reflection. Preferably, the optical light conductor is adapted to guide blue and/or ultraviolet electromagnetic radiation. Other types of fiber optic light conductors may also be used, including gradient-index fiber light conductors, or photonic crystal fiber light conductors.

In case a fiber bundle is used, the intensity distribution of the electromagnetic radiation of the excitation light source may be adjusted using beam shapers or diffractive optical elements, so that upon injection into a fiber optic light conductor each fiber of a fiber bundle receives the same radiation energy.

Another important feature of lighting equipment according to the invention is the imaging of the excitation light exiting from the end face of the light conductor onto the secondary light source using at least one optical element, preferably a focusing element. The secondary light source is in particular defined by a conversion medium, also referred to as a converter, which under remission and/or reflection remits and/or reflects at least part of the excitation light towards the focusing element.

Here, the shade cone defined by the shadowing of the converted light caused by the focusing element or the fiber or its support is very small, due to the selection and the design of the optical elements used according to the invention. This means that the light remitted and/or reflected by the secondary light source which impinges on the optical element is only a small fraction of the total light emitted from the primary light source.

Without limiting generality, the following optical elements which are preferably comprised by the invention are particularly contemplated as options for imaging the fiber end face: spherical lenses and/or rod lenses; GRIN lenses with and without spacer; plano-convex rod lenses.

In addition, elements for deflecting the excitation light may be introduced into the beam path in order to meet the space requirement of a headlight, especially an automobile headlight or a headlight for aerospace applications, or in order to minimize shadowing caused by brackets.

Another means of preserving the beam parameter product of the excitation light and thus for achieving high luminance is vertical irradiation of the remitting and/or reflecting secondary light source. Although in this case the shadowing effect will be at a maximum since the shade cone will be in the maximum of the Lambertian radiation pattern, the numeral aperture NA of the excitation light cone and hence of the shade cone can be kept as small as possible with this imaging. Also, the good light collection of a full parabolic reflector preferably provided is an advantage here.

A basic concept of the invention is the imaging of the light distribution from the light conductor, in particular of a single fiber, onto the converter. Instead of a single fiber, a fiber bundle may be imaged there. Single fibers and fiber bundles are covered by the term light conductor and thus also by the term fiber. This concept may be an option for power scaling of the light source, if, for example, each fiber of the fiber bundle is fed from one laser diode, so that power increase may be achieved by adding more fibers into the fiber bundle. Moreover, the radiation pattern of the headlight may be positively influenced by an appropriate arrangement of the fibers in the fiber bundle. By selectively switching on and off laser diode which are associated with a particular fiber position, this radiation pattern may even be controlled, for example in order to generate an adaptive high beam light.

The invention will further be explained by way of drawings and examples. All drawings are purely schematic, their proportions are not necessarily to scale, and their dimensions and/or proportions may differ from the real existing objects.

EXAMPLE

The excitation light of the primary light source is injected into a light conductor at an entrance end thereof, is guided within the latter and emerges from the exit end thereof. In the illustrated example, the light conductor is a single fiber with a diameter of 180 µm and a numeral aperture NA of 0.22. The spot size of the excitation light on the secondary light source, the converter in the example, should be about 400 µm to ensure a secondary spot diameter of <600 µm.

Thus, the imaging parameters are as follows:
Imaging ratio: $\beta'=-2$
Relation to object distance a and image distance a':

$$\beta' = \frac{a'}{a}$$

From the imaging equation $$\frac{1}{a'} - \frac{1}{a} = \frac{1}{f'}$$

follows:

$$a = -\frac{3}{2}f'$$

or a'=3f'.

To keep the length of the "light lance" and thus the adjustment tolerances as low as possible, a' and hence f' should be as small as possible.

However, arbitrarily small focal lengths are not feasible. The limiting factors are different for different implementation approaches.

According to the invention, in order to obtain the required imaging, optical elements are arranged between the exit end of the light conductor and the secondary light source. The elements listed above are preferably employed as the optical elements. So the following examples are resulting:

Implementation with Spherical Lens or Rod Lens as the Optical Element:

The focal length of a spherical lens is given by $$f' = \frac{n}{2(n-r)}r.$$

For n=1.5, f'=1.5 r, and thus for the example a'=4.5 r.

With the spherical lens, however, shadowing may be large (numeral aperture NA shadowing >0.2, as compared to the numeral aperture NA of the image-side bundle=0.1). This may be improved by a rod lens having spherical lens surfaces, the diameter of which is adapted to the imaging. Whether a spherical lens, a rod lens with spherical surfaces, or even a rod lens with aspherical lens surfaces is used, will be decided by a trade-off between cost and minimal shadowing. Spherical lenses are generally cheaper than rod lenses, but will exhibit larger shadowing.

Arbitrarily small focal lengths cannot be implemented, because the diameter of the circular cross section of the rod lens must be at least greater than the emission spot of the fiber.

A spherical lens based on a circle radius of 1.25 mm and having a diameter of about 1 mm will be suitable.

For producing a useful optical device, the optical element must be fixed. For this purpose, spherical lenses may be exactly fitted into sleeves, rod lenses may be fitted into grooves.

Implementation with Grin Lens as the Optical Element:

A suitable GRIN lens design with a very low numeral aperture NA of the shade cone was manufactured and installed. GRIN (GRadient-INdex) lenses use the optical properties of continuous material transitions. GRIN lenses are typically cylindrical, transparent optical components with a radially decreasing refractive index. Usually, the refractive index decreases quadratic with the distance from the center (parabolic function). A short rod of such a material has an effect like a conventional converging lens, but has flat surfaces at the light entrance and light exit ends.

However, with a GRIN lens, aberration errors are serious in the outer region of the lens unless a specifically optimized refractive index profile is used. A configuration with standard components will have a higher shadowing numeral aperture NA.

Therefore, a preferred optical device uses a spacer between the fiber end face and the GRIN lens. Designs without spacers typically have a higher numeral aperture NA of the shade cone.

For assembling, GRIN lenses are typically cemented to the fibers. Combinations of GRIN lenses and deflection prisms are well known to those skilled in the art.

Implementation with a Plano-Convex Rod Lens:

Plano-convex rod lenses may be assembled similarly to GRIN lenses and may be combined with deflecting prisms. However, the refractive power of plano-convex rod lenses of a refractive index of n=1.5 is limited, so that a combination with high-aperture fibers is impossible. In this case, high refractive hemispherical lenses would have to be used (e.g. sapphire, with n of about 2).

Implementation with Fiber Bundle Instead of Single Fiber:

Instead of the fiber end face, a fiber bundle may be imaged, which does not necessarily need to have a circular cross section but may fill a rectangular cross section, for example. In this manner, the radiation pattern of a car headlight can be adjusted, for example in order to obtain a larger beam angle in a horizontal direction than in a vertical direction. By individually driving the fibers, an adaptive radiation pattern may be achieved. In case of highly asymmetric cross sections of the fiber bundle it may be advantageous to adapt the shape of the imaging element, and to additionally flatten a rod lens, for example.

The light conductor itself preferably comprises glass, at least as a main component, preferably a multi-component glass, or quartz. The light conductor may comprise a core made of the materials mentioned, which is preferably surrounded by a cladding of a considerably lower cladding thickness of the same class of material and which has a lower refractive index than the core material. The light conductor may further, as an additional sheath, be covered by a protective sheath, at least in sections thereof, e.g. of plastic and/or glass braid material. This additional sheath may protect the light conductor from mechanical damage.

The excitation light source is preferably securely and detachably connected to the carrier device. The carrier device may therefore be provided with fixing means for positioning and fixing the excitation light source, thereby enabling simple and safe replacement of the excitation light source. For this purpose, the carrier device may for example be provided with positioning aids, such as stoppers or pins, for accommodating the excitation light source.

For receiving one or more optical light conductors, the carrier device may suitably be provided with furrows or grooves into which the optical light conductor may be inserted and secured by a downholder. V-grooves have been found to be particularly suitable for this purpose, especially for high-precision positioning of optical light conductors. In this way, a stable guidance even of mechanically unstable optical light conductors may be enabled particularly favorably. The optical light conductor may be fixed by means of a downholder.

Precise, highly accurate spatial positioning and orientation of the excitation light source relative to the conversion medium is very important in order to irradiate an accurately predefined area of the conversion medium.

The positioning and orientation of the excitation light source is preferably effected such that the excitation light is emitted towards the conversion medium. For this purpose, the excitation light source is particularly preferably arranged so that the excitation light is incident in an oblique angle onto a central surface area of the conversion medium.

The conversion medium may be a geometrically defined body of various geometrical shapes, for example in the shape of a parallelepiped having six faces, or in the shape of a platelet. The at least one surface of the conversion medium is preferably arranged such that the excitation light is incident upon a central area. In case of a parallelepiped, this may be the center of one face thereof. Incidence in the center is particularly advantageous in terms of heat dissipation in the conversion medium. In addition, efficiency may be improved thereby. In case of a conversion medium comprising a body that has edges, care should be taken to ensure that the excitation light is not incident upon an edge, since this may lead to an inhomogeneous heat distribution and a lower efficiency of remission.

For high luminance it is favorable if the largest possible fraction of the excitation light irradiates a smallest possible area of the conversion medium. This surface area of the conversion medium which is directly in the path of the excitation light, will be referred to as a light spot below. For a high-efficiency lighting equipment, exact positioning of the light spot is required, therefore the exact position of the light spot with respect to positioning aids of the lighting equipment is of very high importance.

The conversion medium is arranged in the beam path of the excitation light source, i.e. along the optical path of the excitation light, in such a manner that the largest possible fraction of the excitation light is incident upon the conversion medium. The electromagnetic radiation emitted by the conversion medium will also be referred to as secondary radiation below. The secondary radiation thus comprises the radiation emitted by the conversion medium, i.e. converted, scattered and/or reflected radiation.

To achieve high luminance and high efficiency, it is important to form a light spot as small as possible and to have the least possible shadowing by the light feed, and a small size of the lighting equipment and little mechanical complexity for exact positioning is of great advantage.

Luminance and efficiency may be influenced by the spacing between the excitation light source and the conversion medium, the size of the excitation light source, and the numeral aperture NA of the excitation light.

A drawback that may result from the geometric arrangement of the excitation light source and the conversion medium is that the excitation light source may be placed within the range of the beam path, i.e. along the optical path, of the secondary radiation, because the excitation light is not transmitted, but remitted. This may lead to unwanted shadowing effects, since the excitation light source and/or the carrier device is in the beam path of the secondary radiation.

In order to minimize these undesirable shadowing effects, the spacing between the excitation light source and the conversion medium may be increased. However, an increase of the spacing may lead to a significant loss of luminance, since with increasing spacing the light spot is typically enlarged, and luminance decreases accordingly.

The inventors have found that a small spacing and low shadowing can be achieved when the conversion medium is rotated by a certain angle with respect to the optical path of the excitation light so that the excitation light will be incident obliquely upon the surface of the conversion medium.

In this manner it can be achieved that the optical path of the excitation light and the optical path of the secondary radiation are not in parallel to each other. In other words, the major part of the secondary radiation is not directed towards the excitation light source and/or the carrier device. In order to achieve a particularly compact and mechanically simple design which allows for a very high accuracy of the position of the light spot, in a particularly preferred embodiment the excitation light source and the conversion medium may be arranged on a common carrier device in a manner so that excitation light is incident to the conversion medium at a defined angle.

In this way it was possible to realize particularly favorable spacings between the point of emission of the excitation light and a central point of the light spot on the surface of the conversion medium in a range from 0.3 mm to 5 mm, by using an optical light conductor.

When a laser light source is used as an excitation light source with a focusing optical system, a particularly favorable distance between the emission point of the excitation light and a central point of the light spot on the surface of the conversion medium is in a range from 1 mm to 30 mm.

A favorable numeral aperture NA may be in a range from 0.02 to 0.3.

When an optical light conductor is used, the size of the excitation light source is defined by the numeral aperture NA and the beam parameter product of the laser light source that result upon injection of the electromagnetic radiation into the light conductor.

Multimode lasers with optical powers in a range around 1 W and with a radiation ranging from about 400 nm to 450 nm may exhibit a beam parameter product from about 0.5 mm*mrad to 1 mm*mrad.

Since laser diodes are typically anisotropic, the radiation is emitted under different angles. In the direction in which the laser zone is narrow, the opening angle of the radiation is large, and vice versa. This anisotropy typically amounts to a factor of about 5 to 10. If the light of the laser diode is injected into a fiber optic light conductor via a rotation-symmetrical lens, the beam parameter product at the exit face end of the light conductor will thereby increase by the factor of the anisotropy, since the angle information in the azimuth is lost. This increase of the beam parameter product can be avoided by adjusting the two different angular distributions to each other, for example using a cylindrical lens or an anamorphic lens.

To ensure the most efficient possible injection into the fiber optic light conductor, the image of the laser may be slightly smaller than the core of the fiber optic light conductor. This may also cause an increase in the beam parameter product. A beam parameter product of about 10 mm*mrad may then result at the exit face end of the fiber optic light conductor.

In case of direct arrangement of a laser light source as an excitation light source, the size of the excitation light source is defined by the height of the configuration and the casing of the light source.

Particularly good experiences have been made with an angle between the optical path of the excitation light and a surface normal of the conversion medium in a range from 30° to 75°.

The conversion medium may be excited by the incident radiation in a defined region. To achieve high efficiency and/or high luminance, the light spot has to be kept as small as possible. Such a light spot may for example cover a surface area of a dimension of preferably less than about 1 mm×1.5 mm, more preferably less than about 0.6 mm×0.9 mm.

Due to the tilting of the conversion medium, the light spot will typically have an oval shape. The conversion medium serves to convert the excitation light into light of longer wavelengths such that light remitted by the conversion medium appears white.

The remission of the excitation light by the conversion medium may be used for the purposes of the invention in that a fraction of the excitation light is converted into long-wavelength yellow light, and another fraction is scattered and/or reflected as blue light. Thus, a first fraction of the excitation light will be converted into a yellow spectral range.

Further, a fraction in the green spectral range of the converted yellow light may be filtered out, so as to obtain a white color location of the remitted light when the color line between the color location of the excitation light and the color location of the converted light does not intersect the desired white color coordinates, but is upwardly offset therefrom in CIE y.

If the color line is below this region, i.e. CIE y is too small, a red component may be filtered out.

Conversion typically produces heat in the conversion medium, which unless appropriately removed may have an adverse effect on radiation conversion, for example may result in a reduction of conversion efficiency or even destruction of the conversion medium.

An advantage with a remission configuration is that the conversion medium may be supported at the rear face, since the excitation light is not transmitted.

This allows for a very simple and cost efficient heat removal from the conversion medium via a rear holder of the conversion medium. Particularly favorably, this rear holder may have heat discharge means and/or may be thermally coupled to a heat sink, in order to permit easy and efficient heat dissipation.

This permits to use an excitation light source of very high luminance which can be operated at high temperatures and yet can produce light in the vicinity of the white point.

Thus, in the context of the invention, a conversion medium refers to a material for optical conversion. Such materials typically contain phosphors which, as optically active media, cause conversion.

Thus, the subject matter of the invention further includes a conversion medium that is suited for converting the excitation light into light of longer wavelengths in a manner so that the light remitted from the conversion medium appears white.

For generating white light, the conversion medium may advantageously be adapted to be particularly well suited for converting of electromagnetic radiation in the blue and/or ultraviolet spectral region.

An opto-ceramic material with an embedded grain structure has found to be a suitable material for the conversion medium for use of excitation light in the blue spectral region.

Most preferably, the conversion medium comprises a low-doped Ce:YAG phosphor material, in particular doped with less than 0.2 wt %. Low doping is advantageous for preventing concentration quenching.

To achieve a white color location of the secondary radiation, most favorably a fraction of the short-wavelength green spectral range may subsequently be filtered out from the yellow converted light. Advantageously, this may be the range of <530 nm. Such filtering may result in a lower efficiency of conversion. However, by using an excitation light source of very high luminance, this drawback can be compensated for.

The exact color adjustment may depend on the radiation spectrum of the excitation light, on the color location to be achieved, or on the heating or cooling of the conversion medium.

In a particularly preferred embodiment, the conversion medium is applied to a broadband reflective material, for example a mirror, a metallic mirror, or a reflective surface, and a band-stop filter may be applied to the surface facing the excitation light source. This band-stop filter may preferably suppress the emission of converted radiation in a range of wavelengths from about 480 nm to 510 nm. Particularly advantageously, radiation of these wavelengths is reflected back into the conversion medium. This radiation may then be converted again so that most favorably the loss in efficiency caused by the filter can be limited.

In another particularly preferred embodiment, an AR coating may be applied on the surface of the conversion medium, and most preferably a coating with a W-shaped filter effect may be selected. Such a coating may have an anti-reflective effect for the excitation light and the converted longer wavelength light, and may thus promote conversion. For excitation light of a wavelength of 450 nm that is incident at an angle of 60° relative to the surface normal of a Ce:YAG ceramic that has a refractive index of 1.83, a single-layer AR coating of $SiO_2$ with a thickness of 94 nm may be particularly advantageous.

Furthermore, the use of a gadolinium-free opto-ceramic conversion medium may be advantageous because of the comparatively high heat resistance thereof. More preferably, an opto-ceramic Ce:YAG material having a thermal conductivity of at least 5 W/(m*K) may be used to achieve particularly high luminance. Such conversion media may be employed at temperatures of up to more than 200° C., for example, without impairing the conversion characteristics and without damage.

In a particularly preferred embodiment for generating white light, a first, converted fraction of the emitted radiation is in the yellow spectral range, with a major part thereof in a range from about 550 nm to 620 nm, and a second, reflected fraction of the emitted radiation is in the blue spectral range, so that by combining these spectral ranges light is produced which is perceived as white by an observer.

The conversion medium may advantageously be directly fixed to the carrier device of the lighting equipment and may be releasable, i.e. the carrier device may be provided with means for securing the conversion medium.

However, it is also possible for the conversion medium to be bonded to a holder which may be securely and releasably connected to the carrier device. However, attachment of the excitation light source and the conversion medium on a common carrier device may be of great advantage in view of a highly accurate positioning of the two components relative to each other and implementation of a very compact design.

The carrier device and/or the holder for securing the conversion medium is preferably adapted for good heat removal. For this purpose, the carrier device and/or the holder may comprise cooling fins, for example. However, it is also possible that they are in thermal communication with a heat sink.

Thus, a very simple and compact lighting equipment for generating light, in particular white light, of very high luminance can be realized, in which the major part of the excitation light enters the conversion medium to be emitted, after having been converted, in the direction of illumination substantially without impinging on the carrier device.

In a further preferred embodiment, the excitation light source may comprise an optical light conductor with a spatially separated excitation light source. This permits to easily replace a defective excitation light source without need to disassemble the lighting equipment.

Due to its compact configuration, the lighting equipment also permits to be installed so as to be rotatable or movable in one or more degrees of freedom to provide for a change in the lighting direction.

In a modification of the invention an optical element for focusing may be arranged within the beam path between the excitation light source and the conversion medium. This permits to focus the excitation light to the conversion medium thereby producing a particularly small light spot so as to enhance luminance. Thus, for optimal conversion, the focus of the excitation light may be within the conversion medium.

The invention and/or lighting equipment comprising the optical device according to the invention can be used in a variety of application fields. They are especially suitable for light sources of high luminance, in particular spotlights. The subject matter of the present invention therefore relates to a spotlight for lighting. For this purpose, the lighting equipment is configured such that the light spot is arranged in the operating point of the reflector.

The lighting equipment may likewise be used for a projector, in which the light spot may be arranged in the operating point of a lens system of the projector.

Furthermore, the invention relates to a headlight for use in vehicles, comprising lighting equipment according to the invention. For this purpose, the reflector may be formed as a headlight or the headlight may comprise lighting equipment according to the invention such that the light spot of the conversion medium is in the operating point of the headlight reflector. When the lighting equipment of the invention is employed for a headlight, the conversion medium has to be selected in compliance with the specifications and guidelines relating to white light for vehicles. For vehicle headlights this is defined in corresponding ECE regulations and CIE standards, for example. In order to achieve day-like light colors, a color location in a range from 5500 K to 6500 K may be favorable. For this purpose, a conversion medium may be selected which based on the radiation spectrum of the excitation light accomplishes conversion into a secondary radiation having a radiation pattern that corresponds to a white color location.

Further details of the invention will become apparent from the description of the illustrated exemplary embodiments and the appended claims.

DETAILED DESCRIPTION

Figure 1:
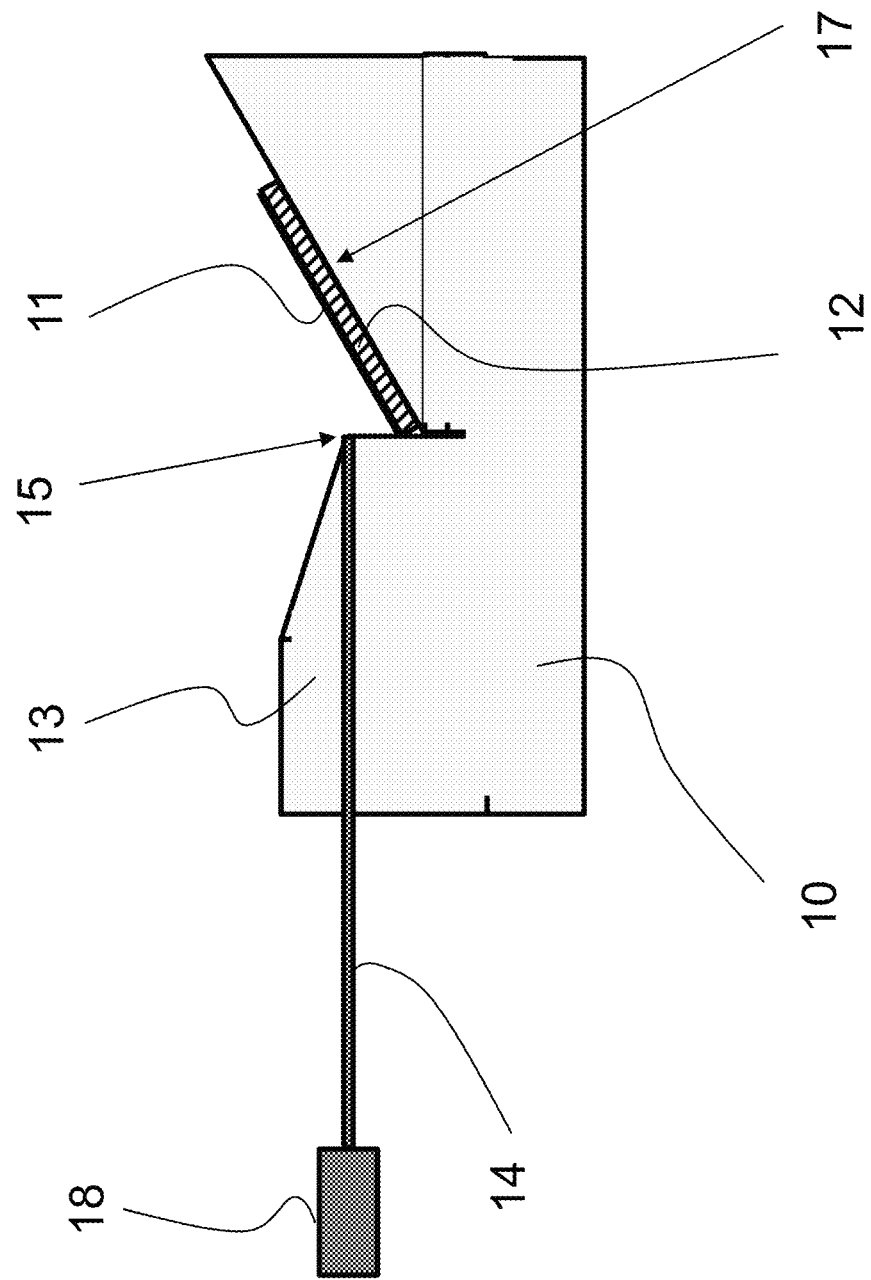
FIG. 1 is a schematic side view of the lighting equipment.

In the following detailed description of preferred embodiments, for the sake of clarity the same reference numerals designate substantially similar elements in or on these embodiments.

FIG. 1 is a schematic cross-sectional side view of lighting equipment according to the invention. The excitation light source comprises an optical light conductor which is configured as a fiber optic light conductor 14 and into which electromagnetic radiation of an excitation light source 18 is injected. Light conductor 14 emits the injected electromagnetic radiation as the excitation light at one end 15 thereof towards a conversion medium 11.

In the region where the conversion medium 11 is fixed, carrier device 10 is provided with a reflective layer 12. This may be a coating on the relevant contact surface 17, for example. It is also possible that a mirror or metallic mirror is provided on the holder. The conversion medium may be securely and/or releasably attached to the carrier device 10.

A downholder 13 serves to fix the at least one optical light conductor 14. A strain relief (not shown) may be provided for securing the fiber optic light conductor. Particularly advantageously, downholder 13 has a very flat design in order to minimize shadowing. A downholder 13 is not mandatory, it is also possible for the optical light conductor to be glued in or on the carrier device, for example.

Figure 2:
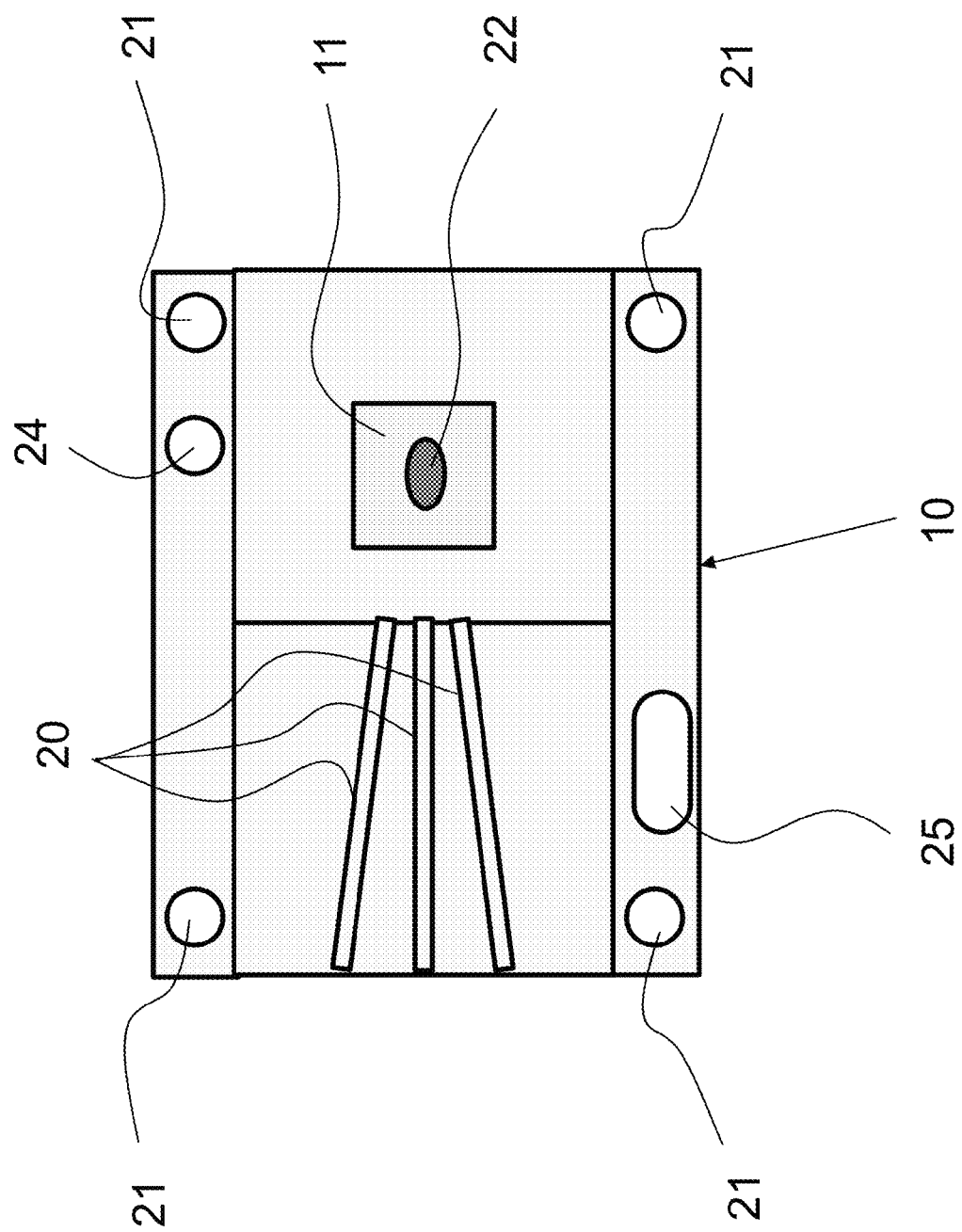
FIG. 2 is a schematic plan view of a carrier device.

FIG. 2 shows a schematic plan view of a carrier device 10 including a conversion medium 11. Three furrows or grooves 20 are provided in total, for accommodating fiber-optic light conductors (not shown) as an excitation light source. Particularly favorably, the furrows or grooves 20 are formed as so-called V-grooves which permit excellent accommodation of fiber optic light conductors without damaging them. The provision of three accommodating means for light conductors 14 is one possible embodiment, but is not mandatory for lighting equipment according to the invention. Rather, the number of optical light conductors 14 will depend on the requirements of the specific application, for example on the luminance to be achieved, or on the temperature of the excitation light source that is to be tolerated.

The at least one accommodating means for light conductors 14 is formed such that one end of the light conductor 14 faces the conversion medium 11. Thus, the conversion medium 11 is in the direction of the optical path of the excitation light. Particularly advantageously, the excitation light is incident on the surface of the conversion medium at a defined point which may be referred to as a light spot 22. To achieve high efficiency and/or high luminance, the light spot 22 has to be kept as small as possible.

Furthermore, the carrier device 10 is provided with openings and/or bores 21 for attachment with other objects such as a reflector (not shown). For high-precision positioning and/or orientation of the carrier device, the latter may be provided with elongated holes 25 and bores 24 for dowel pins, for example.

Figure 3:
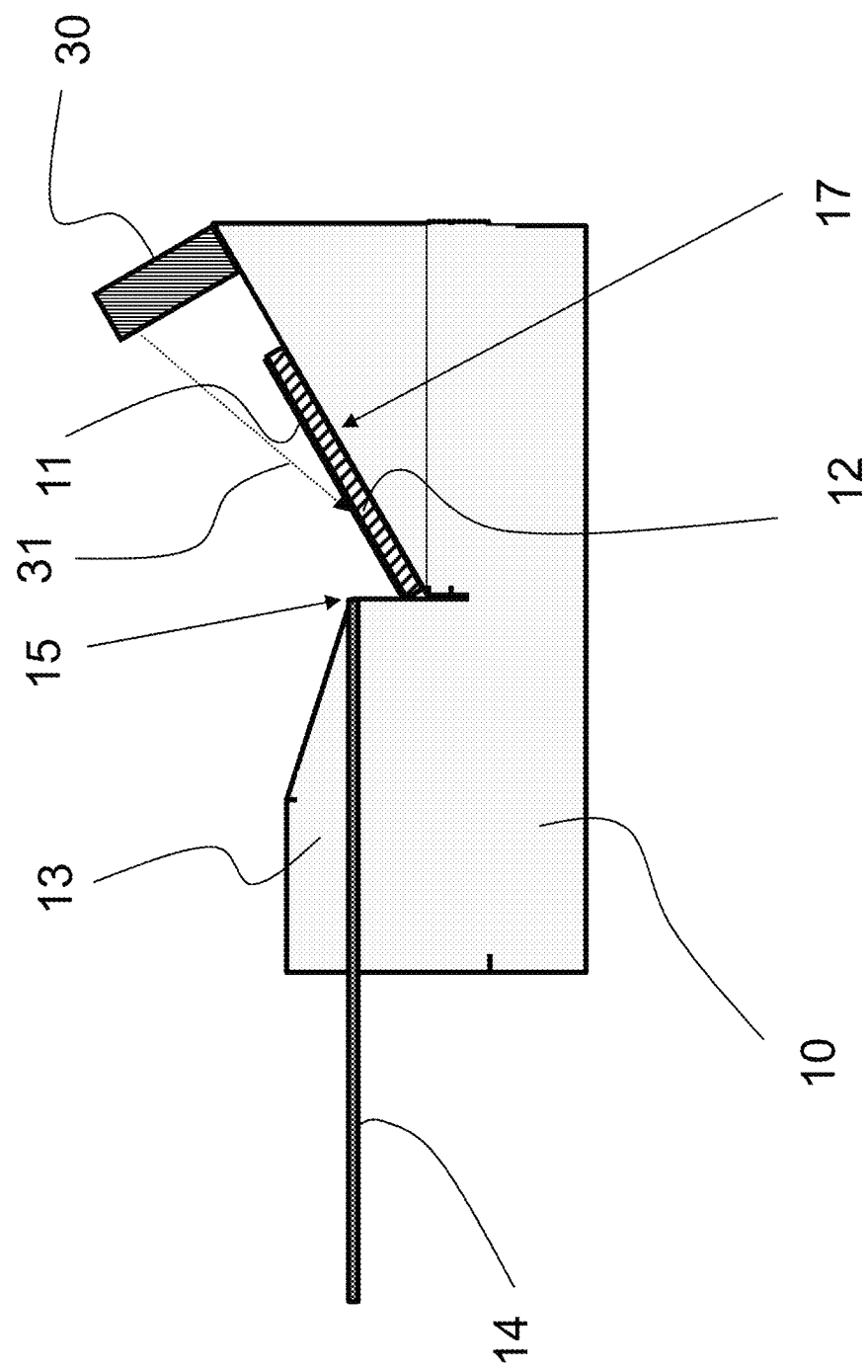
FIG. 3 is a schematic side view of a further embodiment of the lighting equipment.

FIG. 3 shows a further embodiment of the invention. The embodiment includes at least one mirror 30 or a reflective surface by means of which part of the secondary radiation 31 can be directed back to the conversion medium 11. Particularly preferably, this mirror 30 is arranged such that part of the reflected blue radiation may fall back onto the light spot of the conversion medium in order to be converted therein into yellow light of longer wavelengths. In this way, the efficiency of conversion of the excitation light into light of longer wavelengths can be increased.

Figure 4:
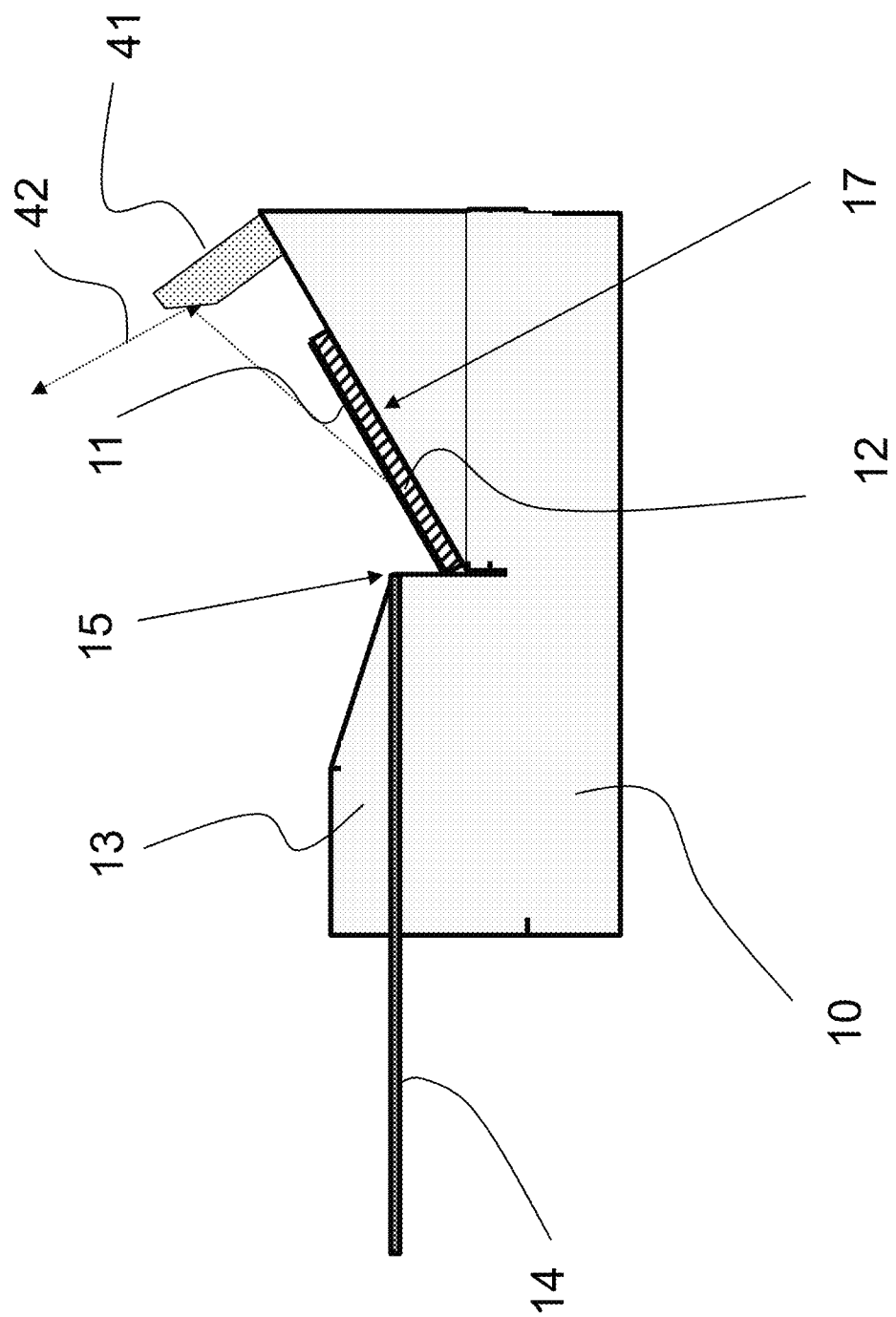
FIG. 4 is a schematic side view of another embodiment of the lighting equipment.

In yet another embodiment, FIG. 4 shows a mirror 41 which may comprise a reflective surface and which is adapted to direct part 42 of the secondary radiation to an exactly defined area in the direction of illumination or into an exactly defined zone (not shown). This area may for example be a specific area in a reflector (not shown). Most preferably, a mirror 41 is arranged such that part of the reflected blue radiation can be directed, by the mirror, to a defined destination in the illumination direction.

Figure 5:
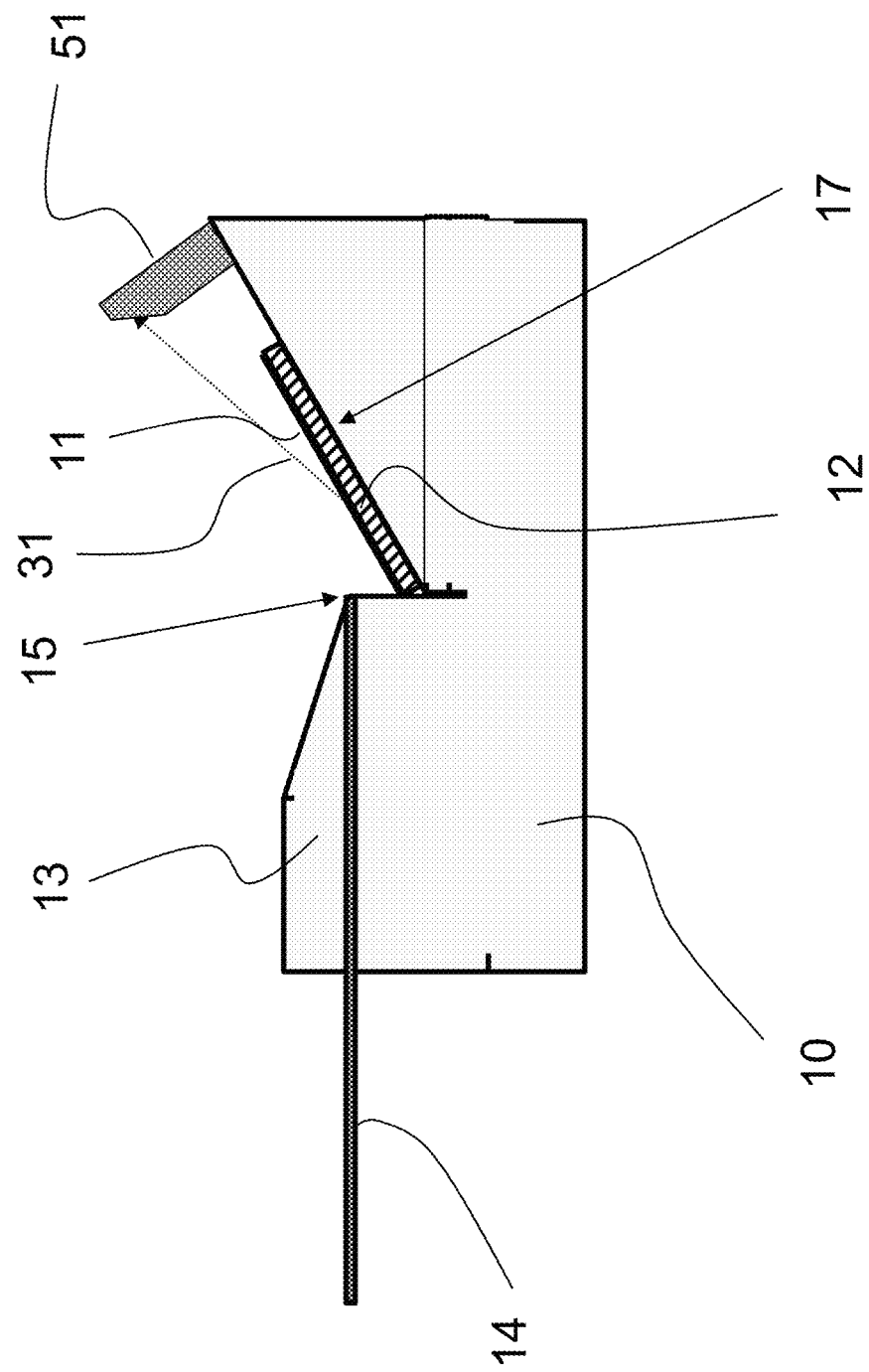
FIG. 5 is a schematic side view of yet another embodiment of the lighting equipment.

Yet another embodiment is shown in FIG. 5. Carrier device 10 comprises an absorber 51 or an absorbent surface which absorbs part of the secondary radiation. In this way, light reflected at conversion medium 11 may be removed from the main beam path of the secondary radiation. Also, in this manner it is easily possible for secondary radiation to be absorbed in case the conversion medium is lost, so as not to be released uncontrollably into the environment. Most advantageously, this effect can be used to increase safety against uncontrolled emitted laser radiation, in case the light source comprises a laser light source.

Figure 6:
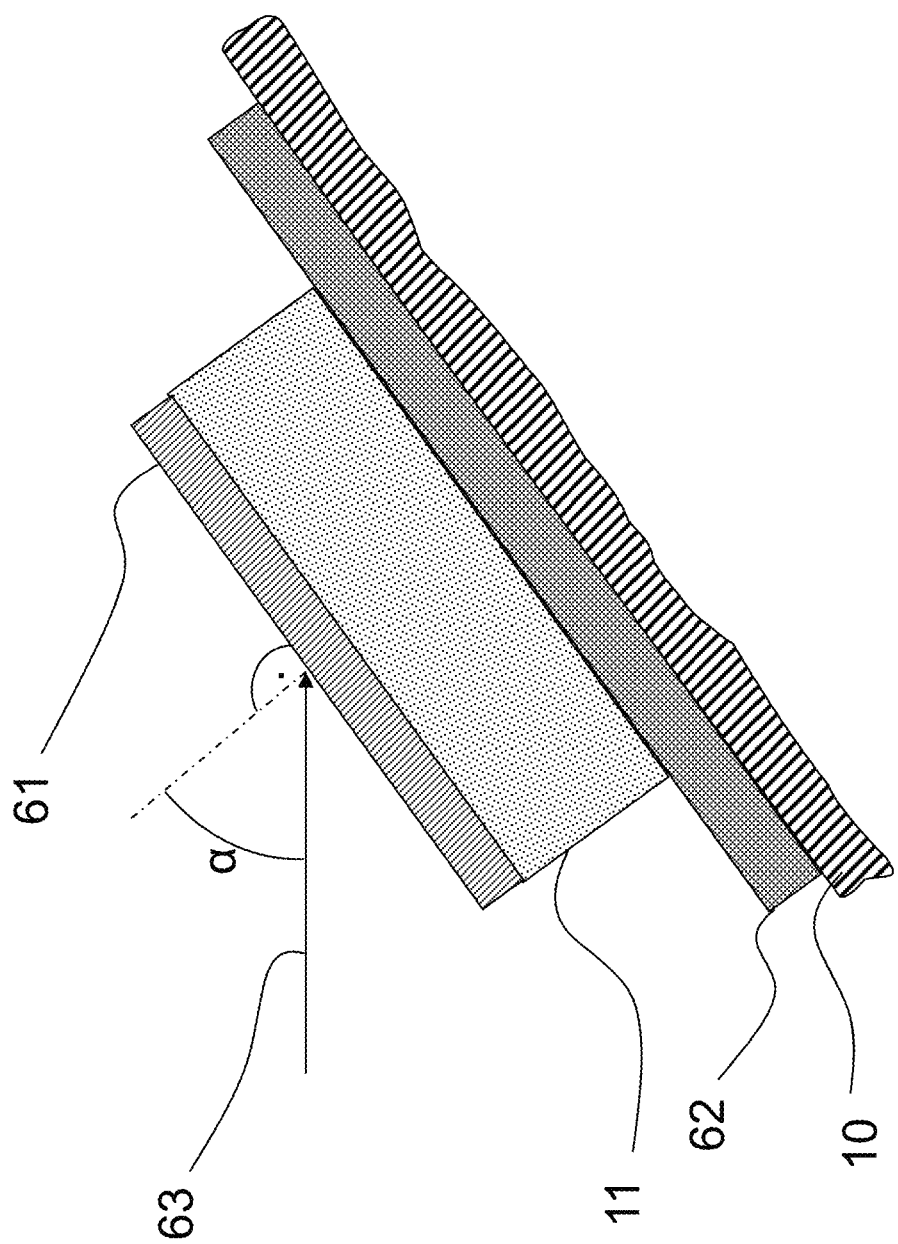
FIG. 6 is a view of an obliquely arranged conversion medium with a coating.

FIG. 6 illustrates a schematic cross-sectional view of a conversion medium arranged obliquely relative to the excitation light. The excitation light propagates along an optical path 63 and impinges obliquely upon the surface of the conversion medium 11, at an angle α. In the mounting area of conversion medium 11, a member of the carrier device 10 is provided with a broadband reflective mirror 62. This may be a broadband reflective coating on carrier member. Conversion medium 11 has the geometrical shape of a platelet with bounding surfaces. Most advantageously, in this case, at least the surface facing the excitation light is provided with a layer 61 that has an effect of a band-stop filter which reflects the green component in the converted yellow light and transmits the yellow-red light component, so that the converted radiation is filtered in a range of wavelengths from about 480 nm to 510 nm. The reflected or backscattered blue spectral component and the converted, filtered yellow spectral component can in combination give white illumination light.

Additionally, layer 61 may be provided with an AR coating to reduce reflection of excitation light and/or converted light so as to improve conversion efficiency.

Figure 7:
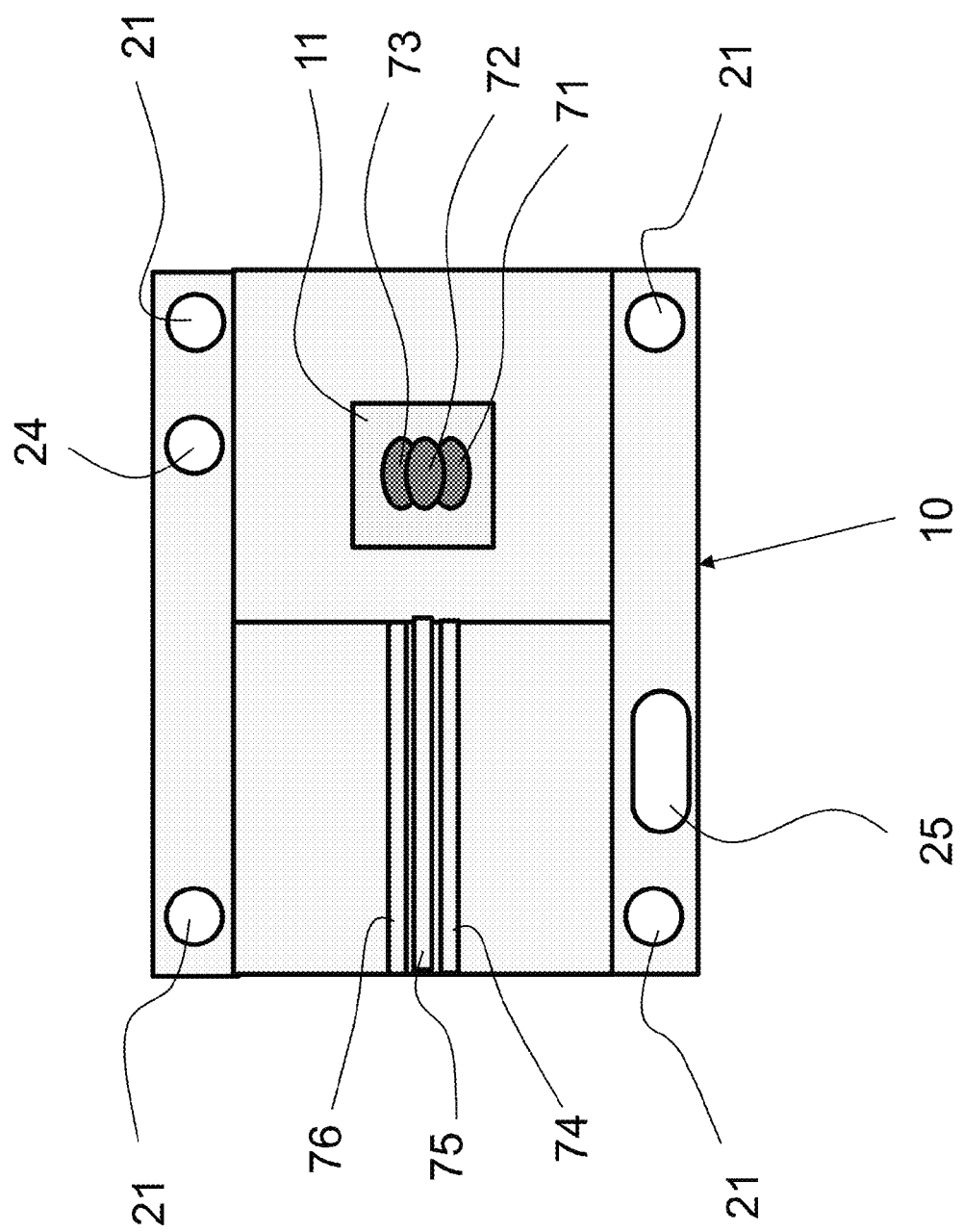
FIG. 7 is another embodiment with a plurality of light conductors arranged in parallel.

FIG. 7 illustrates another embodiment which comprises an excitation light source with a plurality of light conductors arranged in parallel. The light spot formed on the conversion medium 11 may therefore comprise a plurality of individual light spots 71, 72, 73, each of which may be associated with an optical light conductor 74, 75, and 76. The individual light spots 71, 72, 73 may be arranged in an overlapping relationship or may be spatially separated.

By independently switching the excitation light sources (not shown) associated with the individual light conductors 74, 75, and 76, the light spots may be individually activated so that the distribution of luminance on the conversion medium 11 can be varied.

Figure 8:
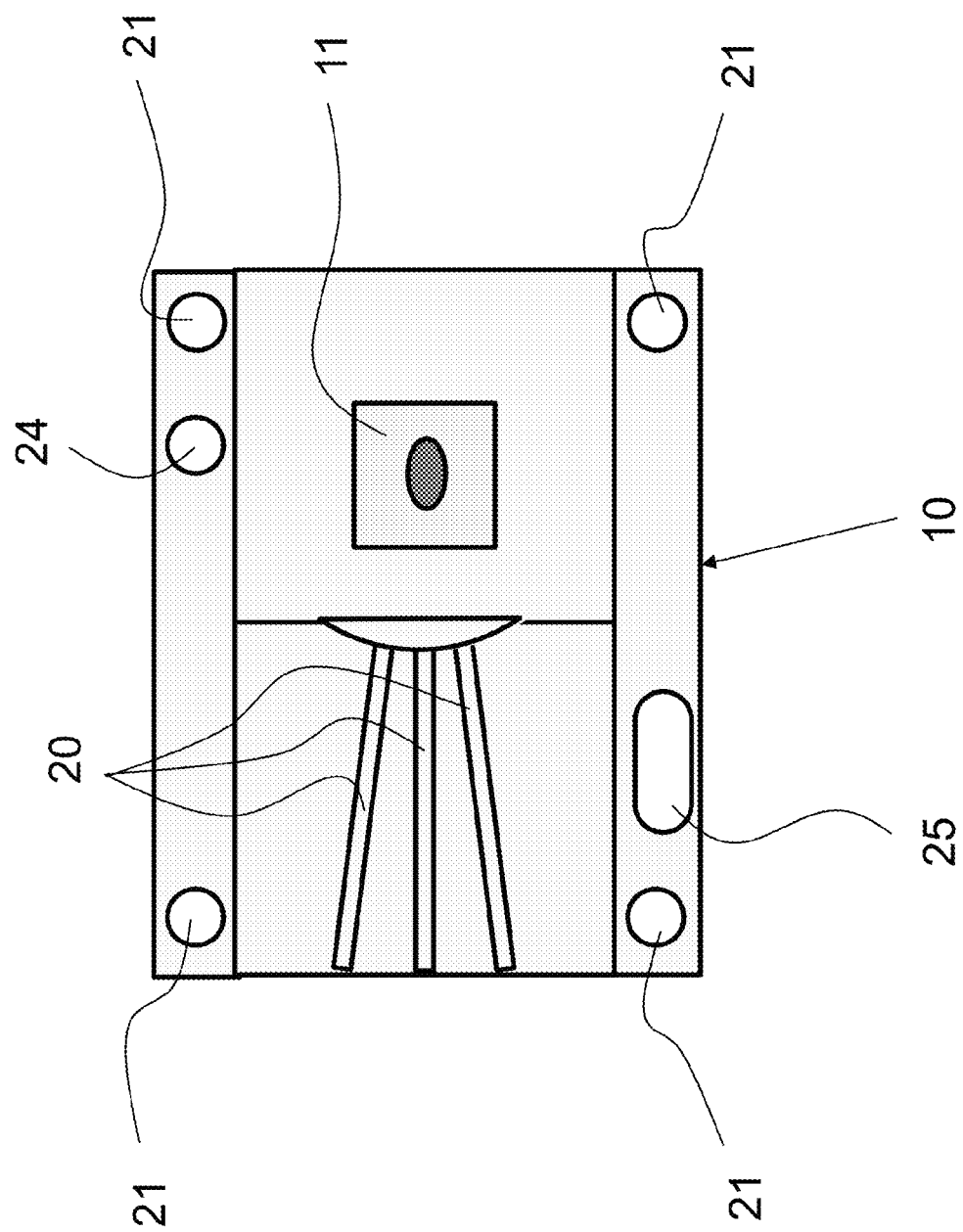
FIG. 8 is yet another embodiment, in which the distance between the emission point of each light conductor and the light spot is the same.

FIG. 8 shows yet another embodiment in which a plurality of optical light conductors are arranged on the carrier device 10, and in which for each optical light conductor the distance from the point of emission to the light spot formed on the conversion medium is the same. This is achieved by arranging them along a circle around the center of the light spot.

Figure 9:
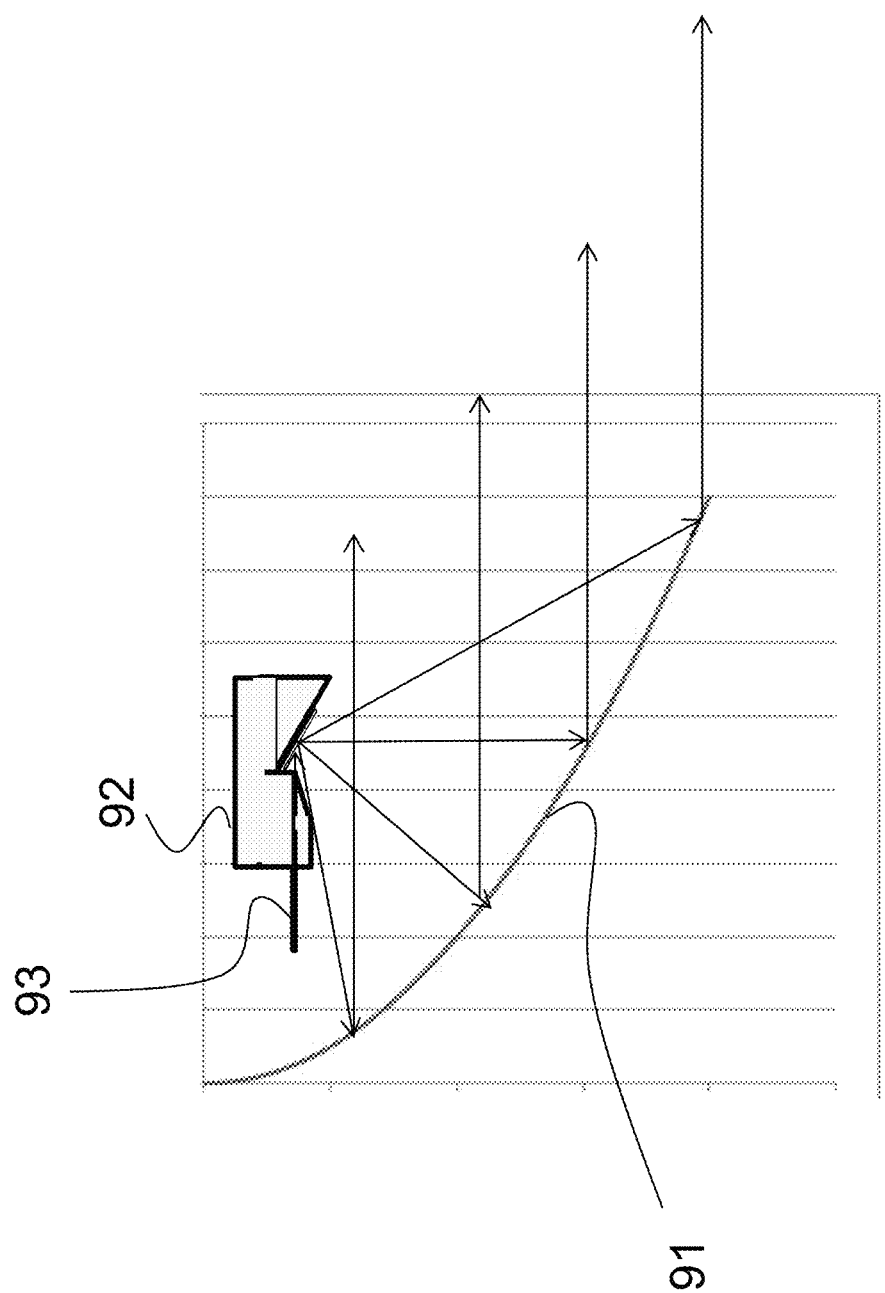
FIG. 9 shows a possible arrangement of lighting equipment in a reflector.

FIG. 9 illustrates a possible arrangement of lighting equipment 92 according to the invention in a reflector 91 which is formed as a semi-parabolic concave mirror. With such an arrangement, an optical light conductor 93 may be routed out of the reflector in a particularly preferred manner, without bending.

Figure 10:
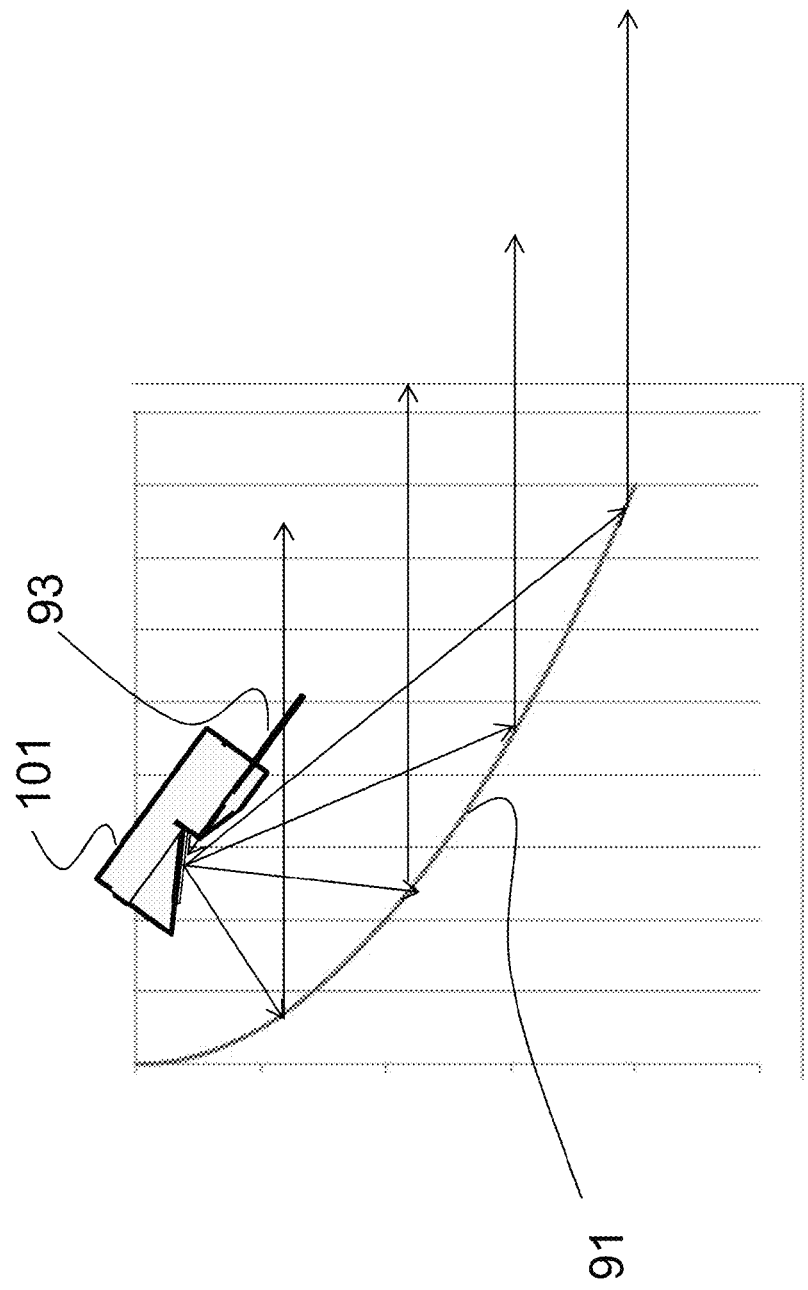
FIG. 10 shows a further embodiment of lighting equipment arranged obliquely in a reflector.

FIG. 10 illustrates yet another embodiment in which lighting equipment 101 is arranged obliquely in a reflector 91, and in which an optical light conductor is located in the illumination direction. With regard to laser safety, such an arrangement can be very favorable in case of damage of the conversion medium, since in this manner the laser beam may be directed into a rear space of the reflector and so cannot be uncontrollably released into the environment.

Figure 11:
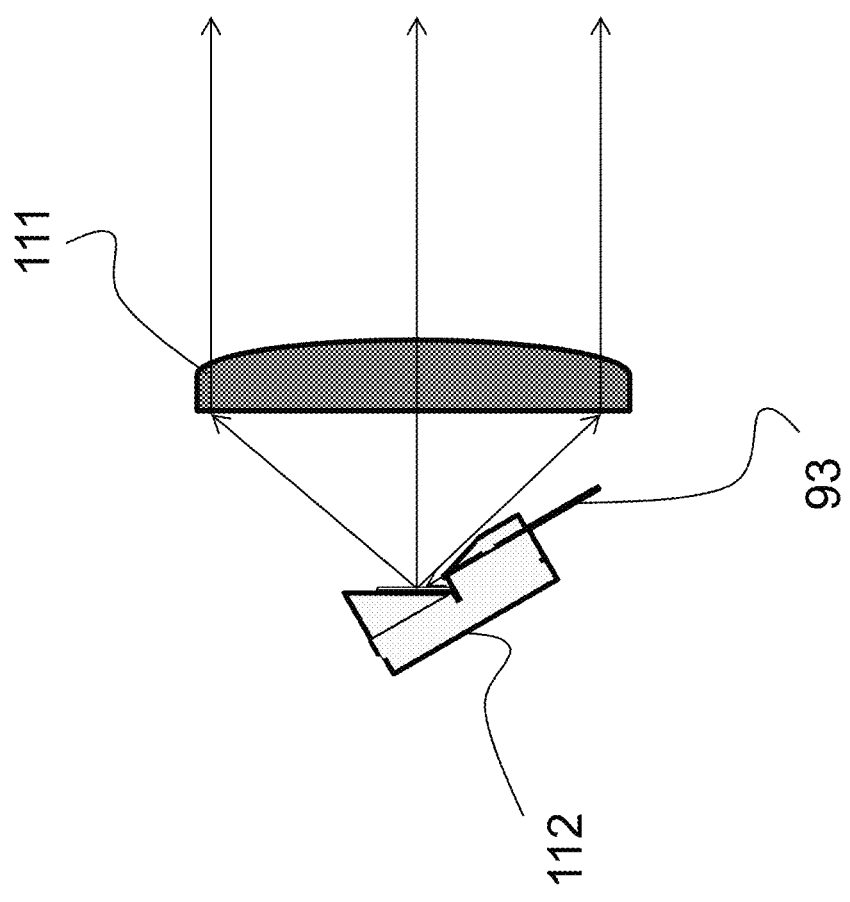
FIG. 11 shows lighting equipment arranged in a projection device.

FIG. 11 schematically illustrates an arrangement of lighting equipment 112 in a projection device. In this arrangement, an optical lens 111 is provided in front of the lighting equipment in the direction of illumination, for directing the generated light in a desired direction.

Figure 12:
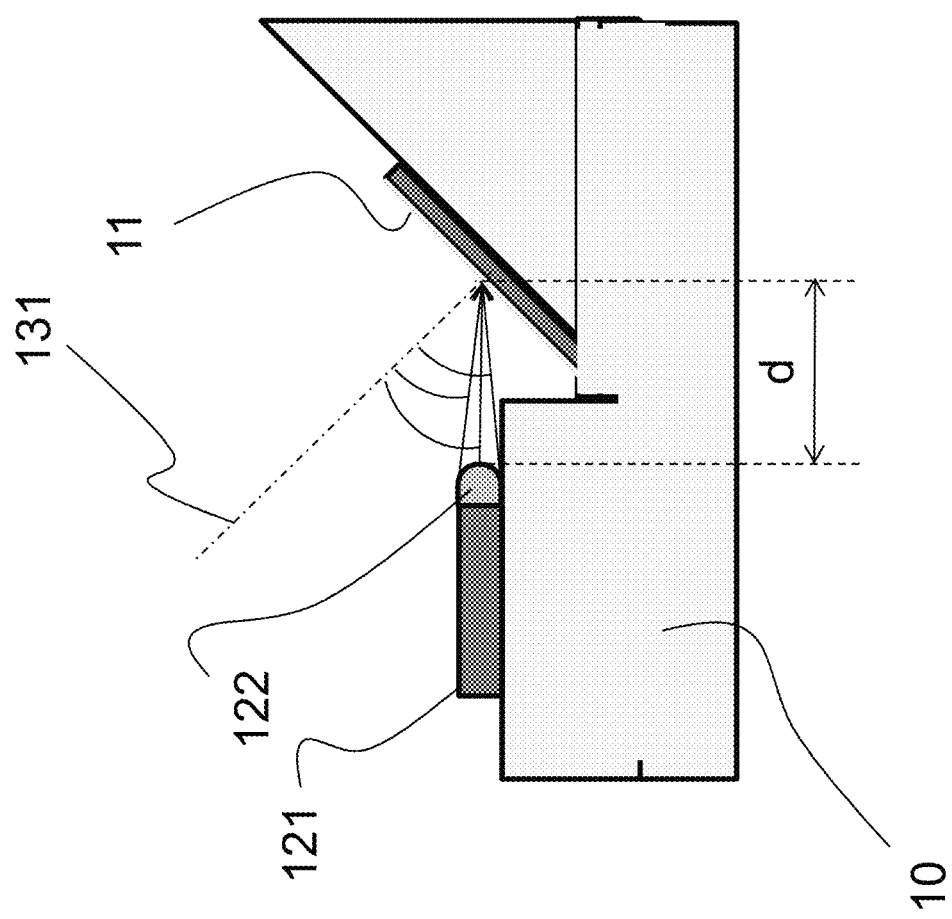
FIG. 12 shows an arrangement with a monochromatic light source and an optical lens.

FIG. 12 illustrates an arrangement in which the excitation light source comprises a monochromatic laser light source 121 which is directly mounted to the carrier device 10. For focusing the excitation light onto the conversion medium 11, an optical lens 122 is provided.

Figure 13:
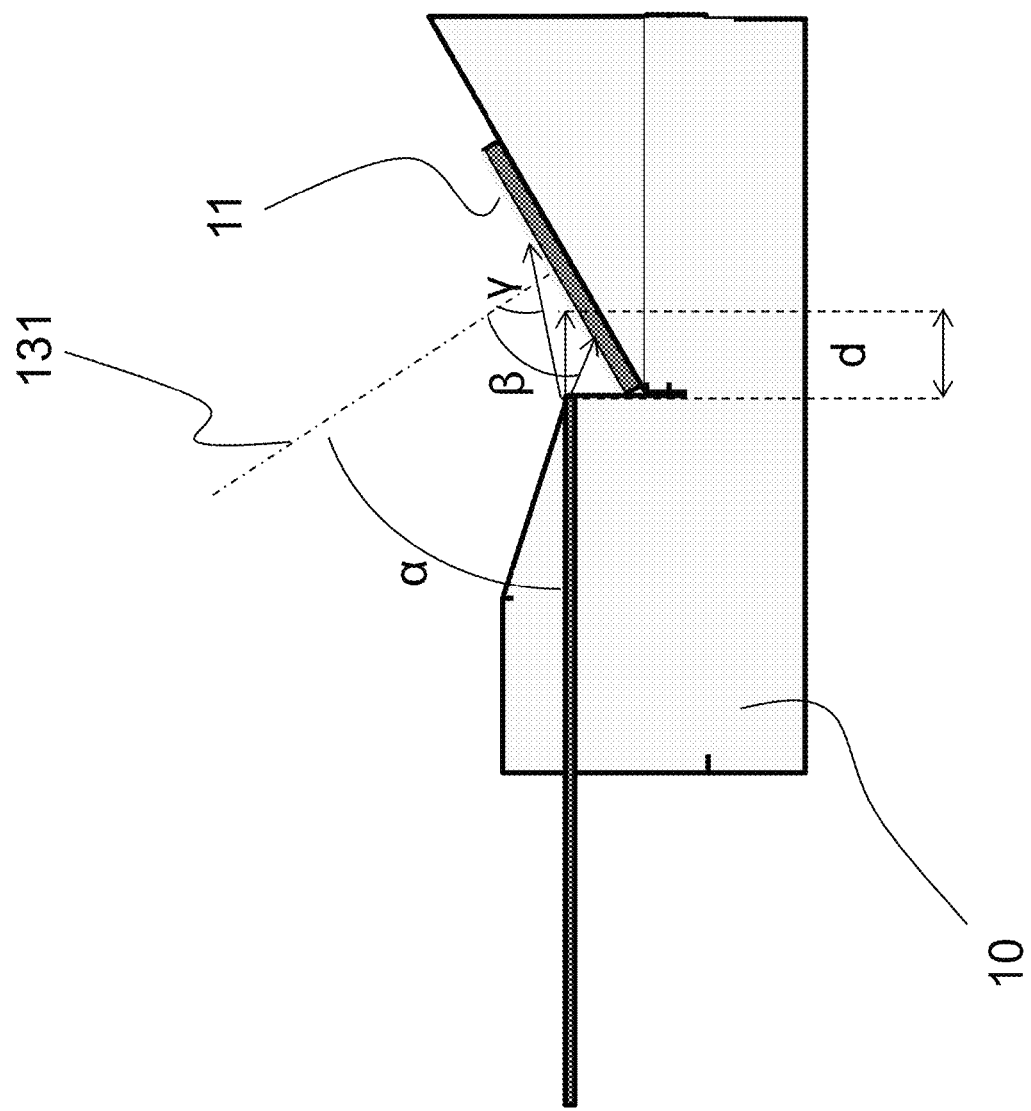
FIG. 13 shows a further arrangement in which the excitation light is incident obliquely upon the surface of the conversion medium.

FIG. 13 illustrates another arrangement of lighting equipment, in which an angle α defines the angle between the optical path of the excitation light and the surface normal 131 of the surface of the conversion medium which faces the excitation light source, so that the excitation light is incident obliquely upon the surface of the conversion medium.

Furthermore, a minimal shadowing angle 13 is illustrated which corresponds to the minimum angle between the surface normal 131 and that beam of the secondary radiation for which the carrier device just has a shadowing effect.

The maximum incidence angle γ corresponds to the largest angle between the surface normal 131 and a beam of the excitation light emitted onto the surface of the conversion medium.

For lighting equipment with an optical light conductor as the excitation light source, favorable configurations with respect to a diameter of the light conductor D, the numeral aperture NA, the distance d between fiber end or lens and light spot, and the angle α of incidence are as follows:

TABLE 1

Configuration for optical light conductors

| NA | D/mm | d/mm | preferred angles α/° | most preferred angles α/° |
|---|---|---|---|---|
| 0.02 | 0.5 | 5 | 35 to 70 | |
| 0.05 | 0.2 | 3 | 40 to 70 | |
| 0.05 | 0.2 | 2 | 40 to 70 | 50 to 60 |
| 0.05 | 0.2 | 1 | 45 to 70 | 50 to 60 |
| 0.1 | 0.1 | 2 | 45 to 65 | 50 to 55 |
| 0.1 | 0.1 | 1 | 45 to 65 | 50 to 55 |
| 0.1 | 0.1 | 0.5 | 45 to 65 | only 55 |
| 0.2 | 0.05 | 0.5 | 50 to 60 | |
| 0.2 | 0.05 | 0.3 | 55 to 60 | |
| 0.3 | 0.033 | 0.3 | only 55 | |

Accordingly, a particularly favorable configuration is, e.g., D=0.1 mm, NA=0.1, d=1 mm and α=45° to 65°, wherein most preferably a is between 50° and 55°. In the preferred range of angle α, the fraction of shadowed light is less than 20%, the maximum angle of incidence is less than 75°, and the size of the oval light spot is smaller than about 1 mm×1.5 mm. In the most preferred range of angle α, the fraction of shadowed light is less than 10%, the maximum angle of incidence is less than 65°, and the size of the oval light spot is less than about 0.6 mm×0.9 mm.

For lighting equipment in which the excitation light source comprises a monochromatic laser light source which is directly mounted to the carrier device, favorable configurations are as follows:

A favorable distance d is determined based on the diameter of the optical lens and the NA such that the focus is in the region of the conversion medium, with the diameter of the lens preferably corresponding to the size of the laser light source. For a size of the laser light source of e.g. 2 mm, preferably a lens of the same size may be selected. With an NA of 0.1, a particularly favorable distance d of about 10 mm is resulting in this case.

TABLE 2

Configuration for laser light source with lens

| NA | preferred angles α/° | most preferred angles α/° |
|---|---|---|
| 0.05 | 35 to 70 | 35 to 65 |
| 0.1 | 40 to 65 | 45 to 60 |
| 0.2 | 45 to 60 | 50 to 55 |
| 0.3 | 50 to 55 | only 55 |

With an NA of 0.1, for example, an angle α is in a preferred range from 40° to 65°, and most preferably in a range from 45° to 60°.

In the preferred range of angle α, the fraction of shadowed light is less than 20%, the maximum angle of incidence is less than 75°. In the most preferred range of angle α, the fraction of shadowed light is less than 10%, the maximum angle of incidence is less than 65°.

Figure 14:
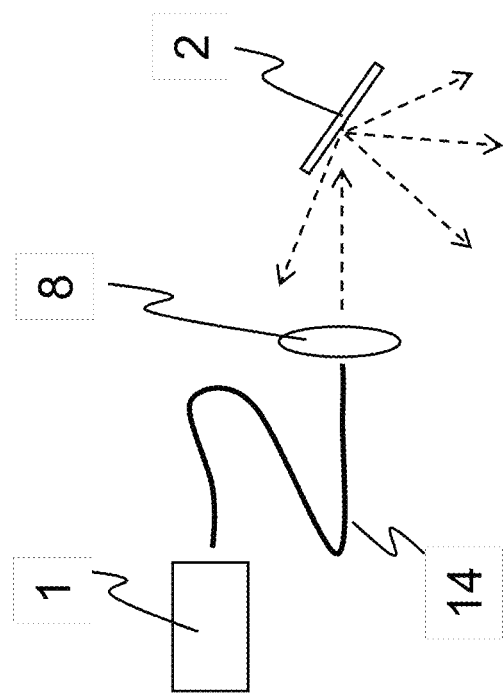
FIG. 14 is a diagram of lighting equipment according to the invention.

FIG. 14 schematically shows lighting equipment according to the invention. The optical element 8 is representative for all suitable optical elements, e.g. a convex lens. As can be seen, the secondary light source 2 is preferably tilted relative to the axis of incidence of the light emitted from primary light source 1.

Figure 15:
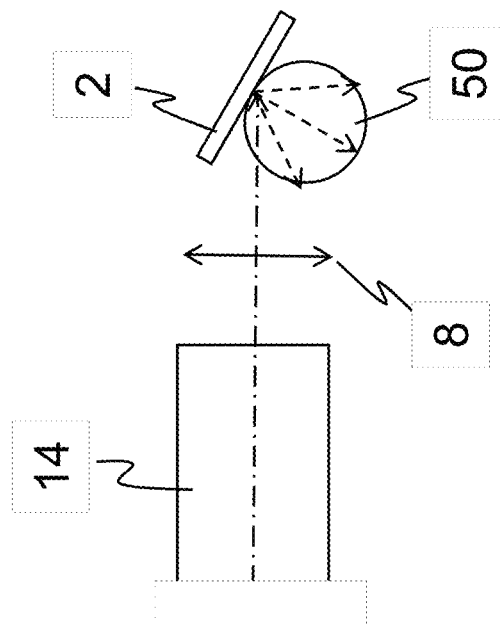
FIG. 15 is an enlarged detail including the exit surface of the light conductor.

FIG. 15 is an enlarged view of a detail including the exit surface of light conductor 14. Optical element 8 directs the light onto a region of secondary light source 2. If the latter is a converter, a light spot will appear on the converter.

Secondary light source 2 emits the light 50 into all spatial directions, which light will preferably be spectrally shifted relative to the light of primary light source 1. Through at least partial reflection and remission at secondary light source 2, the emitted and preferably spectrally shifted light may combine with the spectrally non-shifted light from primary light source 1. In this way, the lighting equipment permits to generate white light for example with a blue laser diode as the primary light source. Alternative, in case of complete remission in secondary light source 2, white light can be generated if the conversion materials used therein already remit white.

Figure 16:
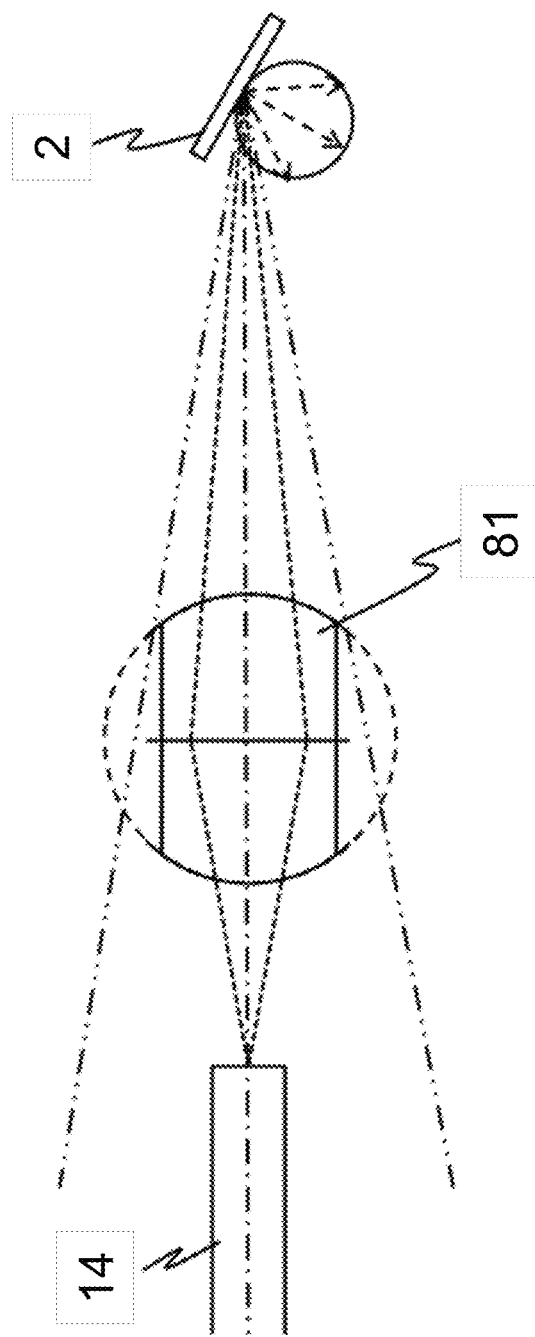
FIG. 16 shows an example of the beam path of a rod lens.

FIG. 16 shows, by way of example, the optical path of a rod lens 81 as the optical element. The reflected and/or remitted light incident on rod lens 81 is also shown as a marginal ray which defines the shadowing caused by the optical element.

Figure 17:
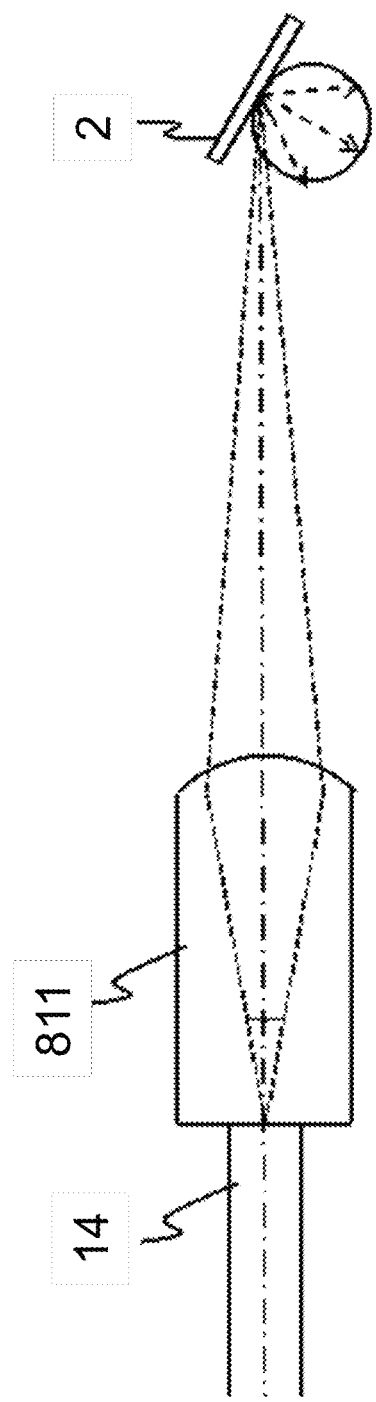
FIG. 17 shows a plano-convex rod lens as an optical element.

FIG. 17 illustrates a plano-convex rod lens 811 as the optical element 8.

Figure 18:
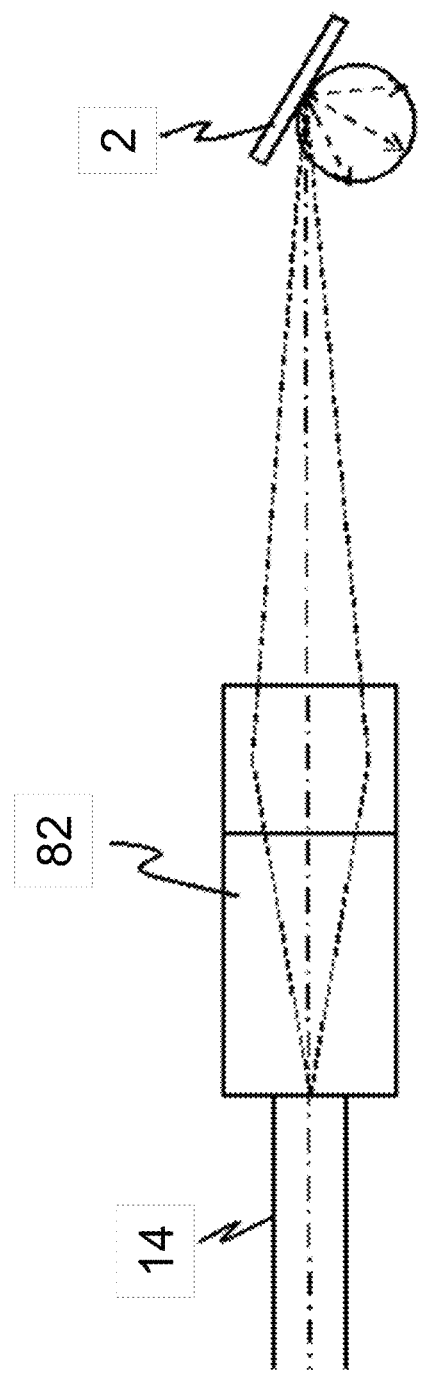
FIG. 18 shows a GRIN lens with a spacer as an optical element.
Figure 19:
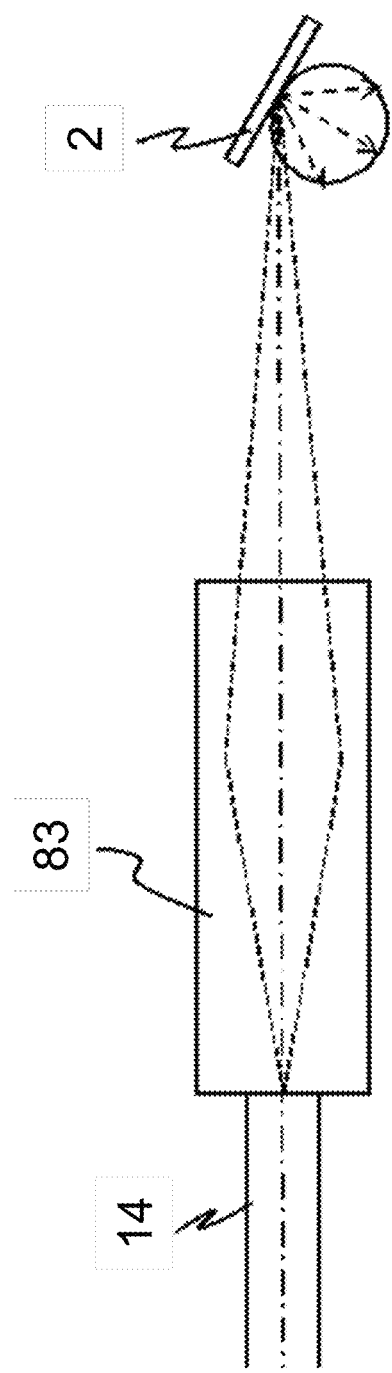
FIG. 19 shows a GRIN lens without a spacer as an optical element.

FIG. 18 shows a GRIN (Gradual Refraction Index) lens with spacer 82 as the optical element 8, FIG. 19 a GRIN lens without spacer 83 as the optical element 8.

For example, lighting equipment may be configured with a spacer and GRIN lens 82 as the optical element 8, as shown in FIG. 18. The light conductor 14 may be a standard step-index fiber light conductor having a core diameter of 180 μm and a numeral aperture NA of 0.22. Values of up to 240 μm for the core diameter and 0.18 for NA are also possible as a standard. The light emitted from primary light source 1 may have a wavelength of 450 nm in the example. The coherence length is irrelevant. Light conductor 14 is cemented to the spacer of GRIN lens 82 according to conventional methods. The spacer has a length of 2.7 mm, for example, and a diameter of 1 mm, the GRIN lens has a diameter of 1 mm and a length of 1.04 mm. Other values are also possible, especially in view of the values of light conductor 14. The distance between the exit face of the GRIN lens and the irradiated surface of secondary light source 2 is 4.2 mm in the present example, and in particular is a free beam area. In this manner, a spot diameter of 429 μm is obtained on the irradiated surface of the secondary light source, and an NA of 0.094.

Figure 20:
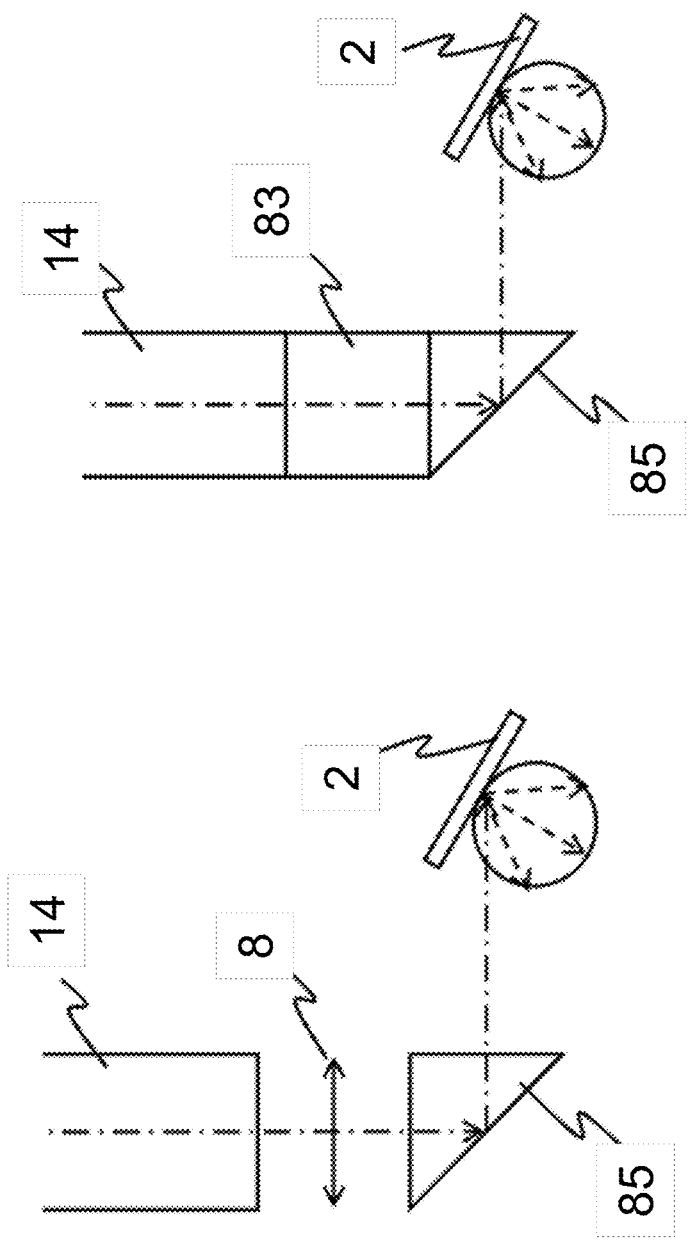
FIG. 20 shows lighting equipment in which the light is deflected.

FIG. 20 shows optional lighting equipment in which the light exiting from light conductor 14 is deflected. This arrangement may be particularly advantageous for some headlight applications. For this purpose, a deflection means 85 is provided between the exit surface of light conductor 14 and secondary light source 2. A suitable optical element 8 may preferably be introduced in the beam path between the exit surface of light conductor 14 and the deflection means 85. In this arrangement, a GRIN lens without spacer 83 may be used particularly favorably, as shown in the right part of FIG. 20.

Figure 21:
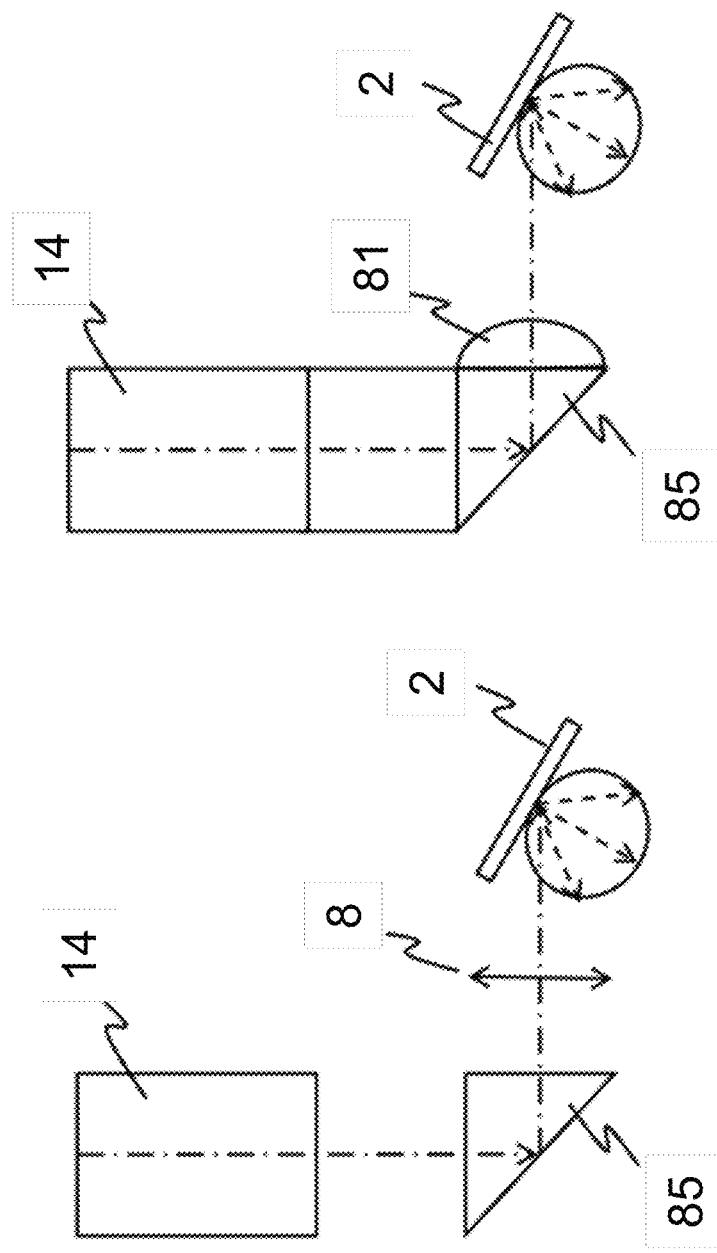
FIG. 21 shows lighting equipment in which the optical element is placed between deflection means and secondary light source.

FIG. 21 is substantially similar to FIG. 20, except that the optical element 8 is mounted between deflection means 85 and secondary light source 2. Any appropriate optical elements may be employed as the optical element 8, however, plano-convex rod lenses 81 have proved particularly favorable. It is also possible to combine the concepts of FIGS. 20 and 21, that is to provide optical elements 8 between the exit surface of light conductor 14 and deflection means 85 as well as between deflection means 85 and secondary light source 2.

Figure 22:
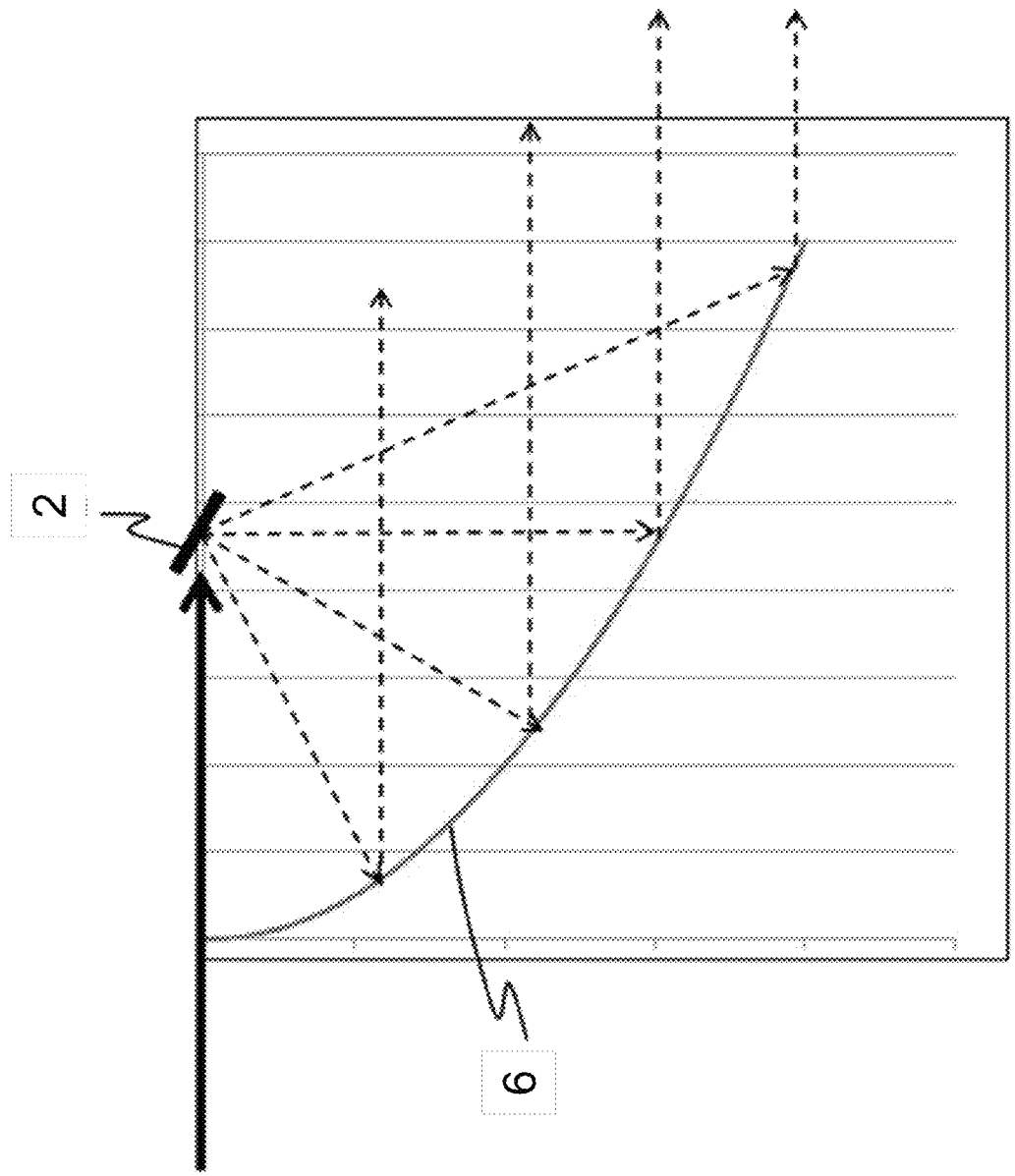
FIG. 22 schematically illustrates lighting equipment of a headlight.

FIG. 22 schematically illustrates lighting equipment of a headlight according to the invention. The light of primary light source 1 is directed onto secondary light source 2, by the measures described above, and is reflected and/or remitted therefrom onto reflector 6. Reflector 6 preferably parallelizes the light derived from secondary light source 2. Reflector 6 may in particular be a parabolic reflector, especially an asymmetric parabolic reflector.

Figure 23:
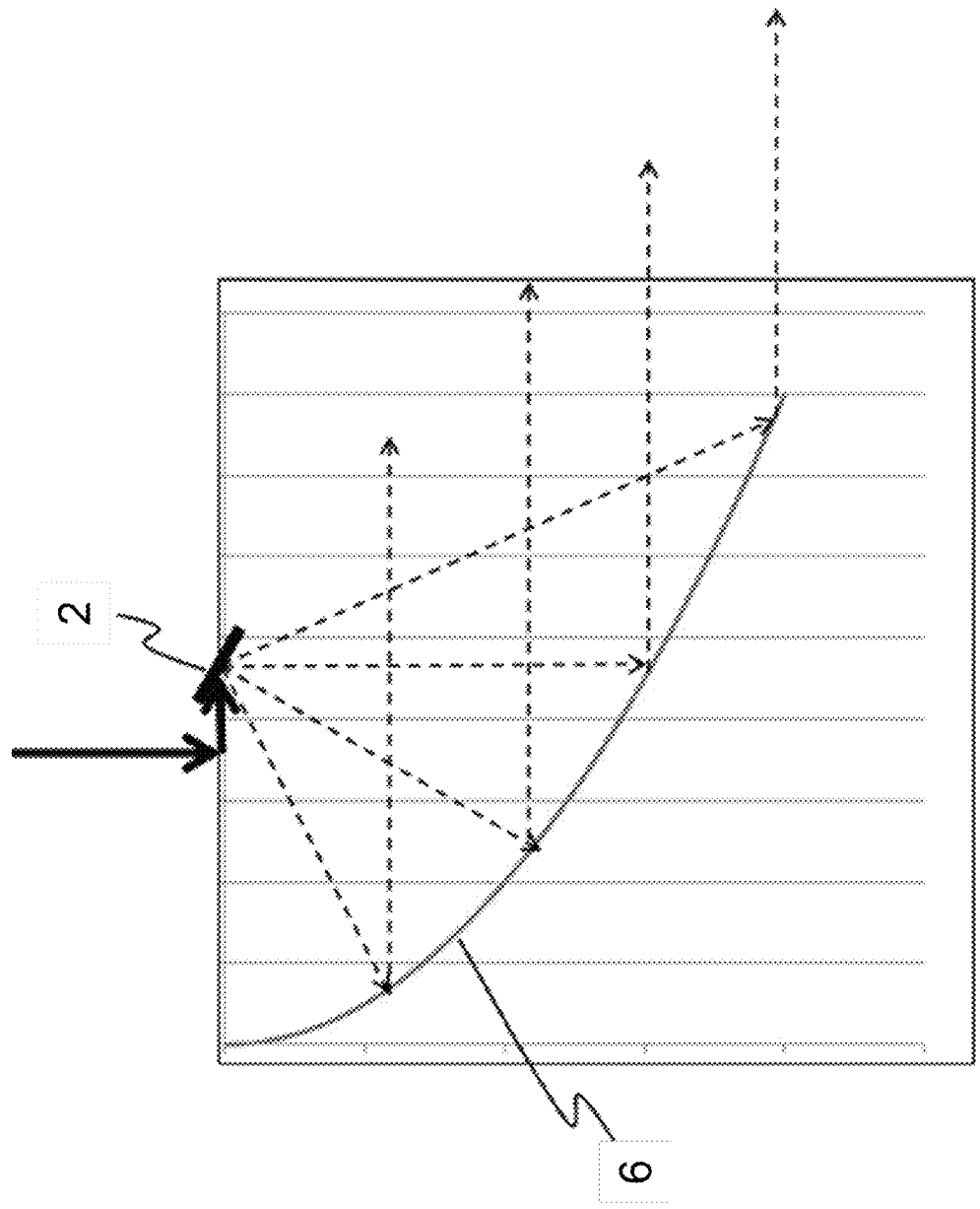
FIG. 23 shows an arrangement in a headlight with a deflecting means and a reflector.

FIG. 23 shows the arrangement in a headlight with reflector 6 similar to FIG. 22, except that deflection means 85 are provided, as in principle illustrated in FIGS. 20 and 21. In this way, the fiber may in particular be routed to the headlight of above.

Figure 24:
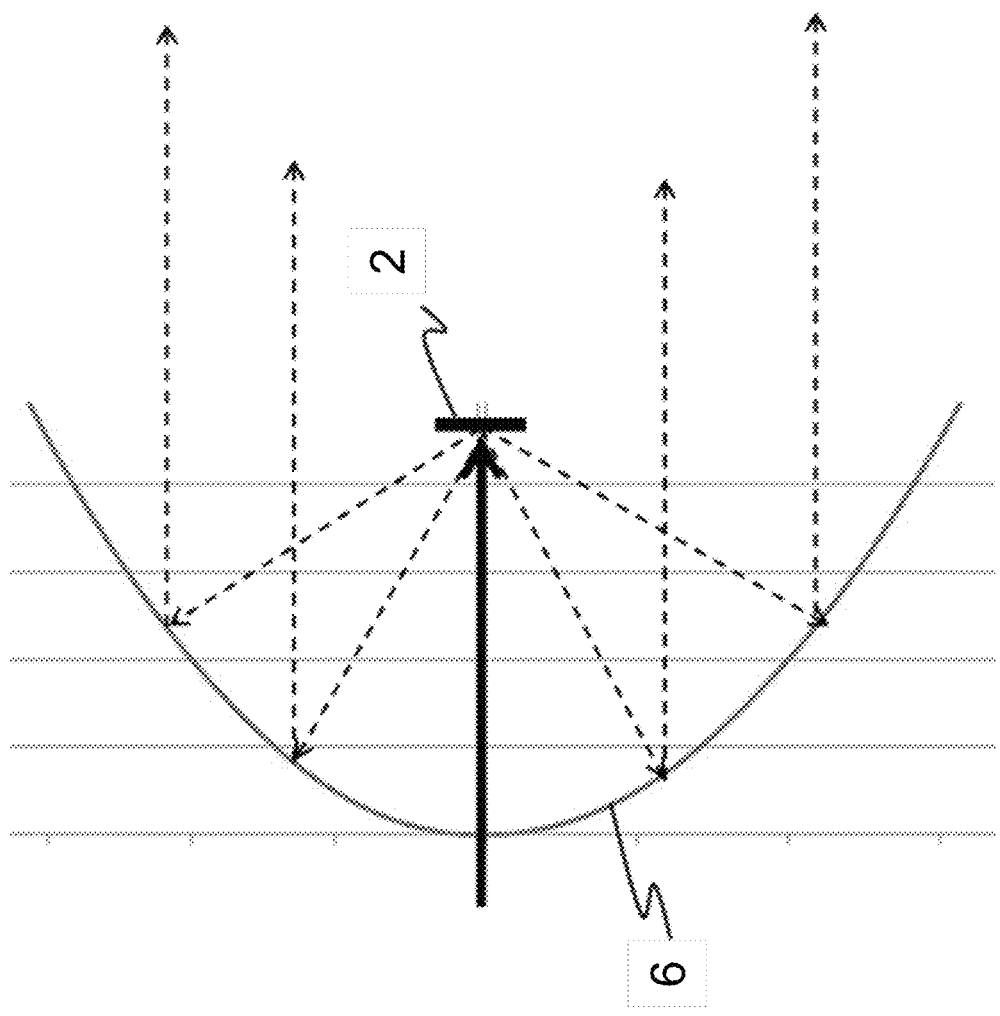
FIG. 24 shows a headlight with a symmetrical reflector.

FIG. 24 shows a headlight including a symmetrical reflector 6 which may have a parabolic configuration. In this example, shadowing by the optical element 8 will be greater than in the other headlights, however, this embodiment may provide other structural advantages, especially in terms of connection to the primary light source 1 and its cooling.

Figure 25:
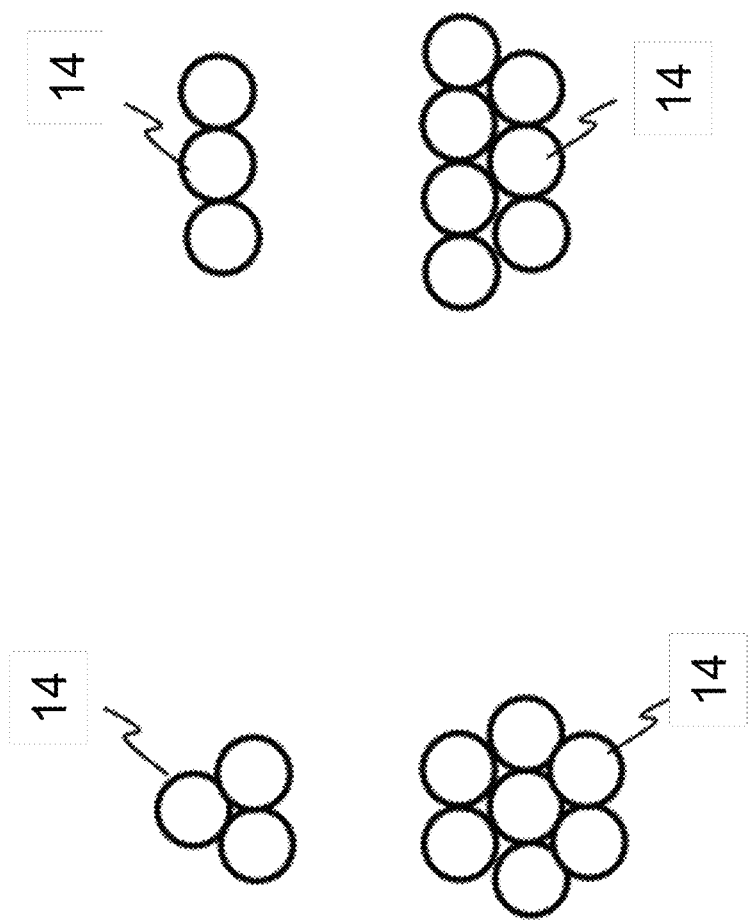
FIG. 25 schematically illustrates several fiber bundles.

FIG. 25 schematically illustrates several exemplary fiber bundle cross sections.

The advantage of the invention over the prior art is based on the fact that by virtue of employing the described optical elements almost any light conductors can be used, which considerably degrade the beam parameter product of the excitation light between fiber end face and converter. The optical equipment according to the invention corrects the degraded beam parameter product, so that the light conductor can be optimally adapted to the primary light source without too much reducing the efficiency of the overall system due to excessive shadowing caused by the optical device.

It will be apparent to those skilled in the art that the invention is not to be limited to the exemplary embodiments described above with reference to the figures, but may be varied in many ways without departing from the scope of the subject matter of the appended claims. In particular, features of individual exemplary embodiments may be combined.

LIST OF REFERENCE NUMERALS

1 Primary light source
2 Secondary light source
6 Reflector
10 Carrier device
11 Conversion medium
12 Reflective coating
13 Downholder
14 Light conductor
15 End of light conductor
17 Contact surface
18 Excitation light source
20 Groove
21 Bore
22 Light spot
24 Bore for dowel pin
25 Elongated hole
30 Mirror
31 Secondary radiation
41 Mirror
50 Emission profile of secondary light source
51 Absorber
61 Band-stop filter
62 Broadband reflective mirror
63 Optical path
71, 72, 73 Light spot
74, 75, 76 Light conductor
8 Optical element
81 Rod lens
811 Plano-convex rod lens
82 GRIN lens with spacer 83 GRIN lens without spacer
85 Deflection means, e.g. prism and/or mirror
91 Reflector
92 Lighting equipment
93 Optical light conductor
101 Obliquely arranged lighting equipment
111 Lens
112 Lighting equipment in a projector
121 Laser light source
122 Lens
131 Surface normal

What is claimed is:

1. A lighting equipment for generating converted white light of high luminance, comprising:
   a primary light source that emits blue or ultraviolet excitation light;
   a conversion medium that converts the excitation light into light of longer wavelengths, the conversion medium being a platelet of an opto-ceramic material with an embedded grain structure; and
   a carrier device that aligns the excitation light to a central surface area of the conversion medium, such that a major part of the excitation light enters the conversion medium, the conversion medium being adapted so that it converts a first fraction of the excitation light into the light of longer wavelengths and backscatters a second fraction of the excitation light in a direction of illumination without impinging on the carrier device so that the light remitted from the conversion medium appears white, wherein the conversion medium is securely and releasable connected to the carrier device.

2. The lighting equipment as claimed in claim 1, wherein the primary light source is an excitation light source.

3. The lighting equipment as claimed in claim 2, wherein the excitation light source is at least one source selected from the group consisting of a monochromatic light source, a laser diode, a UV laser diode, and a blue laser diode.

4. The lighting equipment as claimed in claim 1, further comprising at least one optical element, wherein in operating condition the primary light source emits light into an entrance face of the at least one light conductor, the light conductor conveys the light to an exit face, light exiting from the exit face of the light conductor is directed onto at least a portion of a secondary light source by the at least one optical element, and the secondary light source reflects and/or remits at least part of the light directed thereto back towards the optical element, and a portion of the light reflected and/or remitted is incident upon the optical element.

5. The lighting equipment as claimed in claim 4, wherein in operating condition the fraction of reflected and/or remitted light incident upon the optical element is only a small portion of the light emitted from the primary light source.

6. The lighting equipment as claimed in claim 5, wherein in operating condition the light reflected and/or remitted from the secondary light source is incident on a reflector.

7. The lighting equipment as claimed in claim 6, wherein the reflector is a parabolic reflector.

8. The lighting equipment as claimed in claim 4, wherein in operating condition the optical element focuses the light emitted from the primary light source and exiting from the light conductor onto at least one portion of the secondary light source and wherein a light spot covers a surface area of a dimension of less than 1 mm×1.5 mm.

9. The lighting equipment as claimed in claim 8, wherein the light spot covers a surface area of a dimension of less than 0.6 mm×0.9 mm.

10. The lighting equipment as claimed in claim 4, wherein the optical element is at least one selected from a group consisting of a spherical lens, a rod lens, a GRIN lens without spacer, a GRIN lens with spacer, and plano-convex rod lens.

11. The lighting equipment as claimed in claim 4, wherein the at least one light conductor comprises glass or quartz as a main component.

12. The lighting equipment as claimed in claim 1, wherein the conversion medium converts a first fraction of the excitation light into a yellow range of wavelengths and backscatters or reflects a second fraction of the excitation light as a blue component.

13. The lighting equipment as claimed in claim 1, wherein the conversion medium comprises a low-doped Ce:YAG phosphor material.

14. The lighting equipment as claimed in claim 1, wherein the conversion medium comprises a low-doped opto-ceramic Ce:YAG material having a thermal conductivity of at least 5 W/(m*K).

15. The lighting equipment as claimed in claim 1, wherein the primary light source and the conversion medium are arranged on a common carrier device and at least a conversion medium mounting region of the carrier device and/or a holder for securing the conversion medium is adapted for removal of heat and/or is configured as a heat sink.

16. The lighting equipment as claimed in claim 1, wherein the conversion medium is arranged obliquely, at an angle α, relative to an optical path of the excitation light.

17. The lighting equipment as claimed in claim 1, wherein the lighting equipment is configured for a use selected from the group consisting of a projector, a spotlight, a headlight of an automobile, a headlight of an aircraft, a headlight of a railroad vehicle, and a headlight of a ship.

18. A headlight for a vehicle, comprising the lighting equipment of claim 1, wherein the conversion medium has light spot that is arranged in an operating point of the headlight.

19. The lighting equipment as claimed in claim 1, wherein the conversion medium is applied to a broadband reflective material.

20. The lighting equipment as claimed in claim 1, wherein the carrier device is adapted to align the excitation light at an oblique angle to said central surface area of the conversion medium.

* * * * *